US010225786B2

United States Patent
Fujita et al.

(10) Patent No.: US 10,225,786 B2
(45) Date of Patent: Mar. 5, 2019

(54) DELAY TOLERANT NETWORK (DTN) AND AD-HOC NODE DEVICE

(71) Applicant: NEC Corporation, Tokyo (JP)

(72) Inventors: Norihito Fujita, Tokyo (JP); Norio Yamagaki, Tokyo (JP); Hirofumi Ueda, Tokyo (JP); Shunichi Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 15/108,531

(22) PCT Filed: Dec. 5, 2014

(86) PCT No.: PCT/JP2014/006089
§ 371 (c)(1),
(2) Date: Jun. 27, 2016

(87) PCT Pub. No.: WO2015/104753
PCT Pub. Date: Jul. 16, 2015

(65) Prior Publication Data
US 2016/0323804 A1 Nov. 3, 2016

(30) Foreign Application Priority Data
Jan. 9, 2014 (JP) .................................. 2014-002141

(51) Int. Cl.
*H04W 40/34* (2009.01)
*H04W 40/00* (2009.01)
(Continued)

(52) U.S. Cl.
CPC ............ *H04W 40/34* (2013.01); *H04B 1/713* (2013.01); *H04L 43/16* (2013.01);
(Continued)

(58) Field of Classification Search
CPC ...... H04W 40/34; H04W 40/18; H04W 40/00; H04W 84/18; H04L 43/16; H04M 1/72519; H04B 1/713
See application file for complete search history.

(56) References Cited

U.S. PATENT DOCUMENTS 6,310,883 B1 * 10/2001 Mann ...................... H04L 45/12
370/408
9,202,304 B1 * 12/2015 Baenziger ............... G06T 15/06
(Continued)

FOREIGN PATENT DOCUMENTS

JP 2006-222831 A 8/2006
JP 2009-246419 A 10/2009
(Continued)

OTHER PUBLICATIONS

International Search Report corresponding to PCT/JP2014/006089 dated Mar. 3, 2015 (2 pages).

*Primary Examiner* — Ivan O Latorre
(74) *Attorney, Agent, or Firm* — Wilmer Cutler Pickering Hale and Dorr LLP

(57) ABSTRACT

A node device has a delivery predictability management part, a DTN communication part, and a user interface part. The delivery predictability management part stores, for each destination node, delivery predictabilities including a delivery predictability for the destination node calculated by a local node and a delivery predictability for the destination node calculated by a neighboring node. The DTN communication part refers to the delivery predictabilities for each destination node and selects a next hop node in transferring transfer data from the local node to the destination node. The user interface part allows selection of a destination node for DTN communication with the local node as a source node on a basis of the delivery predictabilities for each destination node.

16 Claims, 20 Drawing Sheets

(51) Int. Cl.
*H04B 1/713* (2011.01)
*H04L 12/26* (2006.01)
*H04M 1/725* (2006.01)
*H04W 40/18* (2009.01)
*H04W 84/18* (2009.01)

(52) U.S. Cl.
CPC ....... *H04M 1/72519* (2013.01); *H04W 40/00* (2013.01); *H04W 40/18* (2013.01); *H04W 84/18* (2013.01)

(56) References Cited

U.S. PATENT DOCUMENTS

| | | | | |
|---|---|---|---|---|
| 9,439,081 | B1* | 9/2016 | Knebl | H04W 16/18 |
| 9,705,634 | B2* | 7/2017 | Lim | H04K 3/22 |
| 2008/0247335 | A1* | 10/2008 | Rudnick | H04L 45/00 |
| | | | | 370/256 |
| 2008/0263637 | A1* | 10/2008 | Nonaka | G06F 21/10 |
| | | | | 726/4 |
| 2009/0227206 | A1* | 9/2009 | Tada | H04L 29/12103 |
| | | | | 455/41.2 |
| 2009/0319176 | A1* | 12/2009 | Kudoh | G01C 21/3617 |
| | | | | 701/408 |
| 2010/0265951 | A1* | 10/2010 | Fujita | H04L 45/12 |
| | | | | 370/392 |
| 2011/0211535 | A1* | 9/2011 | Fujita | H04L 45/18 |
| | | | | 370/328 |
| 2013/0172051 | A1* | 7/2013 | Cudak | H04M 1/274583 |
| | | | | 455/566 |
| 2013/0304616 | A1* | 11/2013 | Raleigh | G06Q 20/145 |
| | | | | 705/34 |

FOREIGN PATENT DOCUMENTS

| | | |
|---|---|---|
| JP | 2012-074882 * | 4/2012 |
| JP | 2012-074882 A | 4/2012 |
| WO | WO-2009/078427 A1 | 6/2009 |
| WO | WO-2013/076912 A1 | 5/2013 |

* cited by examiner

FIG. 4

| DESTINATION NODE | DELIVERY PREDICTABILITY | CALCULATING NODE | VALIDITY TIME |
|---|---|---|---|
| X | 0.4 | B | 2013/11/21 17:10:49.500 |
| X | 0.1 | C | 2013/11/21 17:11:10.000 |
| Y | 0.5 | C | 2013/11/21 17:12:20.000 |
| W | 0.8 | B | 2013/11/21 17:11:55.000 |
| W | 0.3 | C | 2013/11/21 17:10:30.500 |
| ⋮ | ⋮ | ⋮ | ⋮ |

| DESTINATION NODE | NEXT HOP NODE | IP ADDRESS OF NEXT HOP |
|---|---|---|
| X | A | 10.0.0.1 |
| Y | C | 10.0.0.3 |
| Z | A | 10.0.0.1 |
| W | B | 10.0.0.2 |
| ⋮ | ⋮ | ⋮ |

| DESTINATION NODE | IP ADDRESS |
|---|---|
| X | 10.0.0.4 |
| Y | 10.0.0.5 |
| Z | 10.0.0.6 |
| W | 10.0.0.7 |
| ⋮ | ⋮ |

| DESTINATION NODE | IP ADDRESS | TELEPHONE NUMBER |
|---|---|---|
| X | 10.0.0.4 | 070-XXXX-0004 |
| Y | 10.0.0.5 | 070-XXXX-0005 |
| Z | 10.0.0.6 | 070-XXXX-0006 |
| W | 10.0.0.7 | 070-XXXX-0007 |
| ⋮ | ⋮ | ⋮ |

2044

US 10,225,786 B2

DELAY TOLERANT NETWORK (DTN) AND AD-HOC NODE DEVICE

CROSS-REFERENCE TO RELATED APPLICATIONS

This application is a national stage application of International Application No. PCT/JP2014/006089 entitled "Node Device" filed on Dec. 5, 2014, which claims priority to Japanese Application No. 2014-002141 filed on Jan. 9, 2014, the disclosures of which are hereby incorporated by reference in their entirety.

TECHNICAL FIELD

The present invention relates to a node device, a communication network system, a destination node selection method and a program that are used in a delay tolerant network.

BACKGROUND ART

A Delay Tolerant Network (DTN) having a function of temporarily storing transfer data without immediately transferring to a next hop is a network system which enables end-to-end delivery of transfer data with high reliability even in a condition that connectivity between nodes is unstable and low-quality, such as a wireless ad hoc network and a satellite network.

In a DTN, transfer data is divided into unit sizes called bundles and a process of transferring to a destination is executed on each bundle. The greatest characteristic of a DTN is, when a route to the destination of a bundle to transfer is unknown, storing the bundle and waiting until a next hop to transfer the bundle is found without discarding the bundle. By performing such an operation, even when an end-to-end route from a source node to a destination node does not exist at a time, it is possible to first transfer a bundle to a halfway node and then restart transfer of the bundle at a moment that a route to the destination node is made. As a result, there is an effect that the rate of arrival at a destination node increases.

Therefore, a different method from IP routing, which is finding an end-to-end route from a source node to a destination node, is used as a route control method in a DTN. One of the typical methods for routing in a DTN is a routing method called PROPHET, which is based on the delivery predictability for a destination node.

In the PROPHET, routing based on the delivery predictability for a destination node is performed. To be specific, when one node A neighbors another node B, the node A updates delivery predictability $P_i$ for the node B in accordance with the following equation:

$$P_i = P_{(i-1)} + (1 - P_{(i-1)}) \times P_{init} \qquad \text{Equation 1.}$$

In Equation 1, $P_{(i-1)}$ is the delivery predictability for the node B of the node A before update. Further, $P_{init}$ is an initialization constant and satisfies $0 < P_{init} < 1$.

Further, in a case where the node A and the node B remain not neighboring each other, the node A regularly updates the delivery predictability $P_i$ by a method called aging and gradually reduces the delivery predictability in accordance with the following equation:

$$P_i = P_{(i-1)} \times \gamma^k \qquad \text{Equation 2.}$$

In Equation 2, $\gamma$ is a reduction parameter and satisfies $0 < \gamma < 1$. Moreover, k is the number of times that a unit time passes after the node A and the node B last neighbor each other.

When a node holds a bundle whose destination is a certain node, the node exchanges the delivery predictabilities $P_i$ for the destination node with neighboring nodes, and forwards the bundle to a neighboring node having the highest delivery predictability. Moreover, in a case where the delivery predictabilities for the destination node of the neighboring nodes are smaller than the delivery predictability for the destination node of the node, the node retains the bundle without forwarding to any of the neighboring nodes.

Thus, in the PROPHET, routing by comparison in magnitude of the delivery predictabilities for a destination node which are calculated based on a neighboring history is performed.

Further, Patent Document 1 discloses a method of not only calculating the delivery predictability for a destination node on the basis of a neighboring history but also calculating the delivery predictability on the basis of a history of end-to-end routes to the destination node from the past to the present registered in a routing table within a node. Thus, in the PROPHET, a method extended to use as the delivery predictability not only a value calculated on the basis of a neighboring history alone but also a value calculated on the basis of another parameter as disclosed by Patent Document 1.

Patent Document 1: International Publication No. WO2009/078427

As mentioned before, a DTN enables end-to-end delivery of transfer data with high reliability even in a condition that connectivity between nodes is unstable and low-quality. However, transfer data does not always arrive at a destination node from a source node quickly, and it sometimes takes a long time to arrive. Then, it varies depending on destination nodes whether transfer data quickly arrives or it takes a considerable time to arrive. This is because the transfer data delivery predictability for a destination node from a certain node varies depending on destination nodes. It is one of the important information for users using DTN communication whether or not there is a probability that transfer data quickly arrives at a destination node. However, the transfer data delivery predictability for a destination node of each node is merely used for route control and even existence thereof is not recognized by the users. Therefore, it is difficult for the user of a source node to select a destination node by using the delivery predictability.

SUMMARY

An object of the present invention is to provide a node device which solves the abovementioned problem, namely, the problem that it is difficult for the user to select a DTN communication destination node by using the delivery predictability.

A node device according to a first aspect of the present invention has:

a delivery predictability management part storing delivery predictabilities for each of destination nodes, the delivery predictabilities including a delivery predictability for the destination node calculated by a local node and a delivery predictability for the destination node calculated by a neighboring node;

a DTN communication part referring to the delivery predictabilities for each of the destination nodes and selecting a next hop node in transferring transfer data from the local node to the destination node; and a user interface part allowing selection of a destination node for DTN communication with the local node as a source node on a basis of the delivery predictabilities for each of the destination nodes.

A communication network system according to a second aspect of the present invention is a communication network system including a plurality of nodes.

Each of the nodes has:

a delivery predictability management part storing delivery predictabilities for each of destination nodes, the delivery predictabilities including a delivery predictability for the destination node calculated by a local node and a delivery predictability for the destination node calculated by a neighboring node;

a DTN communication part referring to the delivery predictabilities for each of the destination nodes and selecting a next hop node in transferring transfer data from the local node to the destination node; and a user interface part allowing selection of a destination node for DTN communication with the local node as a source node on a basis of the delivery predictabilities for each of the destination nodes.

A destination node selection method according to a third aspect of the present invention is a destination node selection method executed by a node.

The node has:

a delivery predictability management part storing delivery predictabilities for each of destination nodes, the delivery predictabilities including a delivery predictability for the destination node calculated by a local node and a delivery predictability for the destination node calculated by a neighboring node;

a DTN communication part referring to the delivery predictabilities for each of the destination nodes and selecting a next hop node in transferring transfer data from the local node to the destination node; and a user interface part.

The destination node selection method includes:

by the user interface part, allowing selection of a destination node for DTN communication with the local node as a source node on a basis of the delivery predictabilities for each of the destination nodes.

A computer program according to a fourth aspect of the present invention includes instructions for causing a computer to function as:

a delivery predictability management part storing delivery predictabilities for each of destination nodes, the delivery predictabilities including a delivery predictability for the destination node calculated by a local node and a delivery predictability for the destination node calculated by a neighboring node;

a DTN communication part referring to the delivery predictabilities for each of the destination nodes and selecting a next hop node in transferring transfer data from the local node to the destination node; and a user interface part allowing selection of a destination node for DTN communication with the local node as a source node on a basis of the delivery predictabilities for each of the destination nodes.

With the configurations described above, the present invention allows the user of a node device to select a destination node by using the delivery predictability.

BRIEF DESCRIPTION OF DRAWINGS

FIG. 4 is a diagram showing an example of the configuration of delivery predictability data calculated by a neighboring node of the delivery predictability data of the node according to the first exemplary embodiment of the present invention;

FIG. 5 is a diagram showing an example of the configuration of a routing table for DTN communication of the node according to the first exemplary embodiment of the present invention;

FIG. 6 is a diagram showing an example of the configuration of a node list of the node according to the first exemplary embodiment of the present invention;

FIG. 17 is a diagram showing an example of the configuration of a node list of the node according to the second exemplary embodiment of the present invention;

EXEMPLARY EMBODIMENTS

Next, an exemplary embodiment of the present invention will be described in detail referring to the attached drawings.

[First Exemplary Embodiment]

Figure 1:
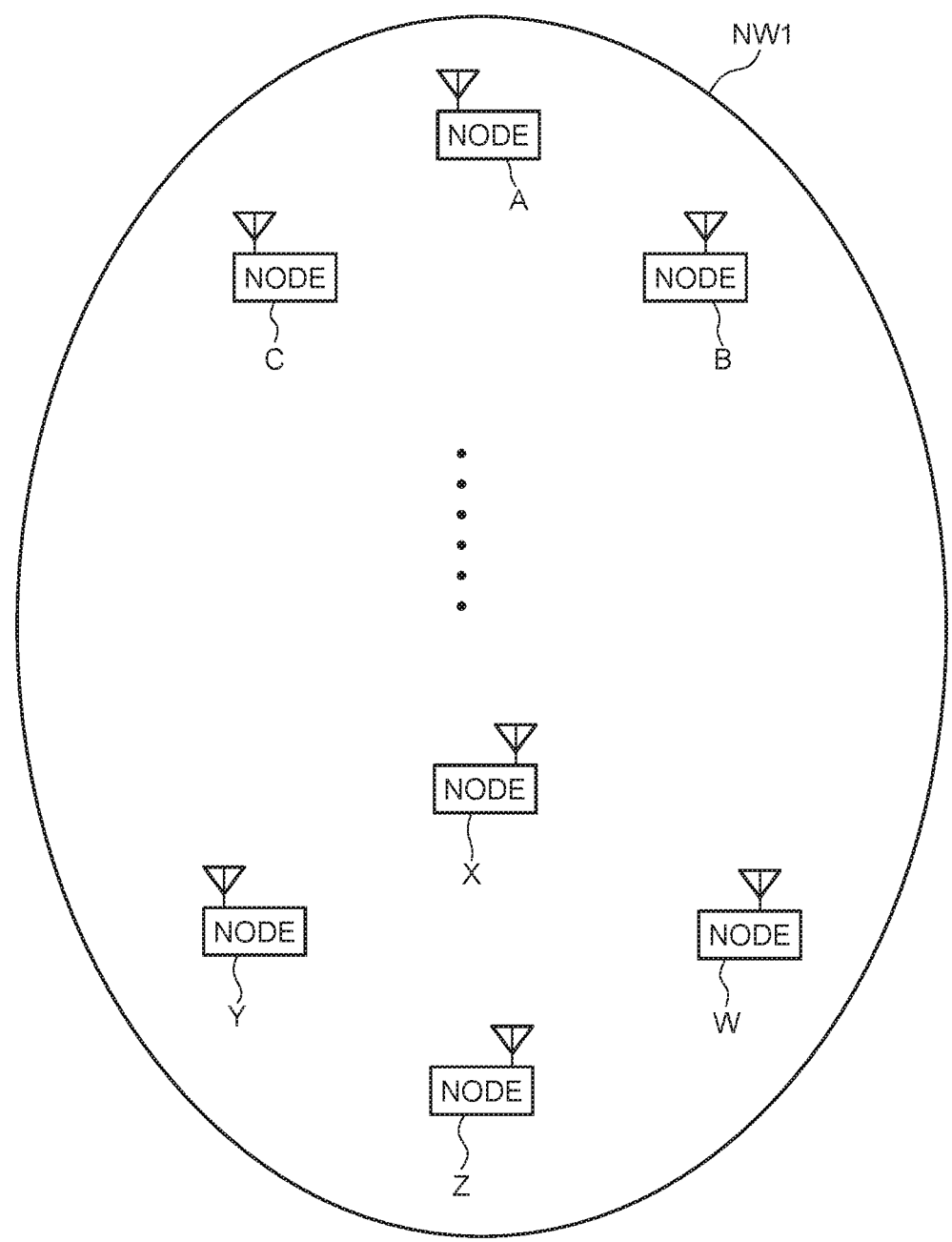
FIG. 1 is a diagram showing an example of the configuration of a communication network system according to a first exemplary embodiment of the present invention.

Referring to FIG. 1, a communication network system NW1 according to a first exemplary embodiment of the present invention is a delay tolerant network which temporarily stores transfer data in a midpoint node and thereby enables delivery without end-to-end reachability from a source node to a destination node. The communication network system NW1 is configured by a node A, a node B, a node C, . . . , a node W, a node X, a node Y, and a node Z. The number and arrangement of the nodes may be any number and arrangement, and the respective nodes A to Z can move.

Figure 2:
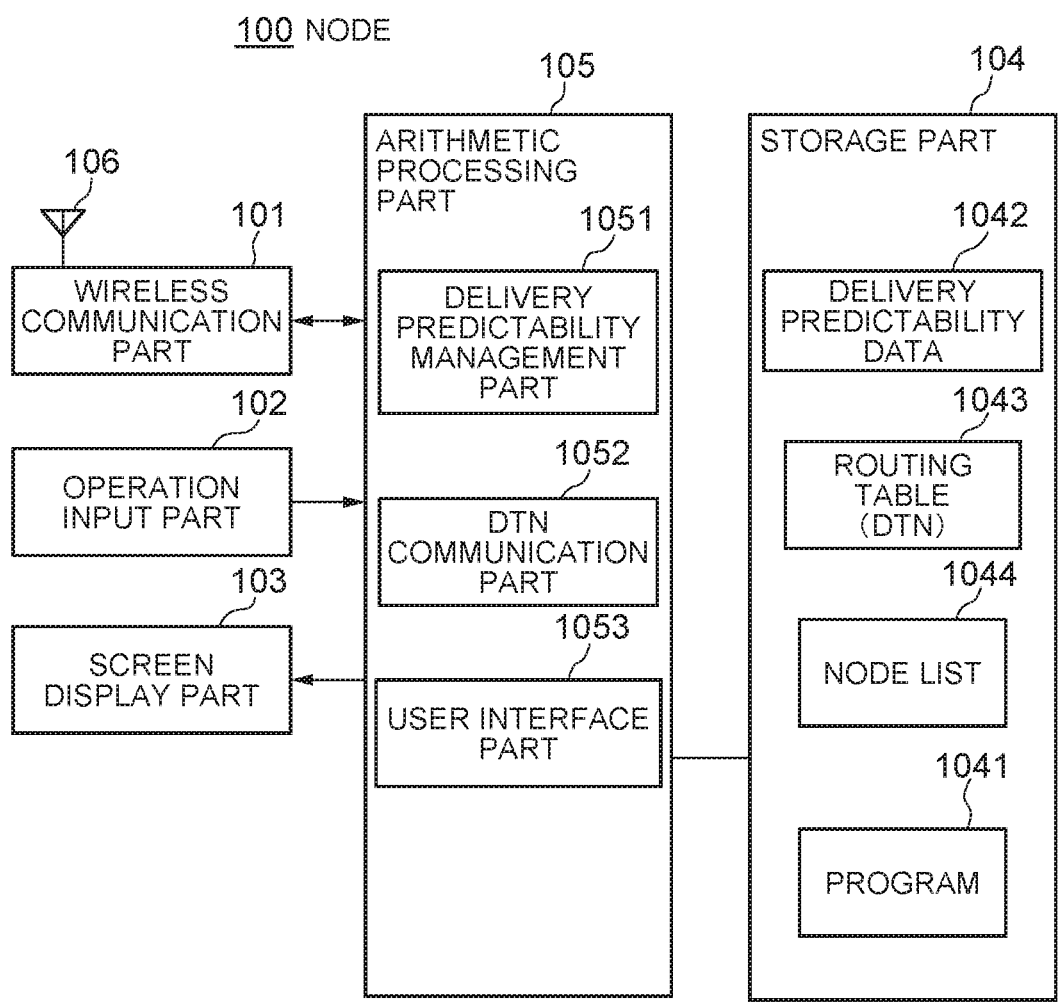
FIG. 2 is a block diagram showing an example of the configuration of a node according to the first exemplary embodiment of the present invention.

FIG. 2 shows the configuration of a node 100 which can be used as each of the nodes A to Z. The node 100 has a wireless communication part 101, an operation input part 102, a screen display part 103, a storage part 104, an arithmetic processing part 105, and an antenna 106.

The wireless communication part 101 has a function of exchanging communication messages with another node by radio, such as NFC (Near Field Communication). At the time of transmission, the wireless communication part 101 creates a packet of a communication message in response to a request from the arithmetic processing part 105, executes a process such as addition of a header and an error detection code on the created packet, generates a modulation signal of a carrier wave frequency band from the processed data, and transmits as a radio signal from the antenna 106. At the time of reception, the wireless communication part 101 demodulates a radio signal received by the antenna 106 to decode a packet of a communication message, and notifies a communication message on which it is confirmed that there is no error on the basis of an error detection code to the arithmetic processing part 105.

The operation input part 102 is configured with an operation input device such as a keyboard and a mouse, and has a function of detecting an operation by an operator and outputting to the arithmetic processing part 105.

The screen display part 103 is configured with a screen display device such as a LCD (Liquid Crystal Display) and a PDP (Plasma Display Panel), and has a function of performing screen display of various kinds of information such as a destination node selection screen in response to an instruction from the arithmetic processing part 105.

The storage part 104 is configured with a storage device such as a ROM (Read Only Memory), a RAM (Random Access Memory) and a hard disk, and stores a program 1041 and process information. The program 1041 is a program which is loaded and executed by the arithmetic processing part 105 to implement various kinds of processing parts. Major process information stored by the storage part 104 is delivery predictability data 1042, a routing table 1043, and a node list 1044.

The delivery predictability data 1042 is data of the delivery predictabilities for destination nodes calculated by a local node and a neighboring node. The delivery predictability for a destination node calculated by a neighboring node is one transmitted from the neighboring node as described later.

Figure 3:
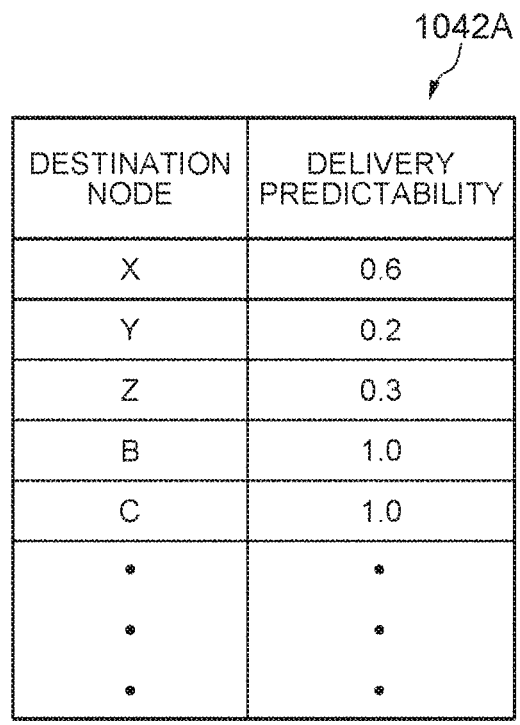
FIG. 3 is a diagram showing an example of the configuration of delivery predictability data calculated by a local node of delivery predictability data of the node according to the first exemplary embodiment of the present invention.

FIG. 3 shows an example of the configuration of delivery predictability data 1042A for destination nodes calculated by a local node (the node A) of the delivery predictability data 1042. In this example, for each destination node (for example, the name and IP address of the destination node), the delivery predictability for the destination node is recorded. Referring to FIG. 3, the delivery predictability for the node X is 0.6, the delivery predictability for the node Y is 0.2, the delivery predictability for the node Z is 0.3, and the delivery predictabilities for the nodes B and C are both 1.0. Herein, delivery predictability is obtained by quantifying a probability held by each node of being able to deliver a bundle to a destination node, and takes a value equal to or more than 0 and equal to or less than 1. A case where a certain node has delivery predictability of 1.0 for a destination node shows that the node has a direct route to the destination node. Further, a case where a certain node has delivery predictability of 0 for a destination node shows that there is no probability of being able to deliver a bundle from the certain node to the destination node or the probability is unknown. Furthermore, a case where a certain node has delivery predictability more than 0 and less than 1 for a destination node shows a state where the node has had a direct route to the destination node before but does not have the direct route currently. Then, the magnitude of delivery predictability is calculated on the basis of an elapsed time from time when there was a direct route to a destination node last, and the like.

FIG. 4 shows an example of the configuration of delivery predictability data 1042B for destination nodes calculated by a neighboring node of the delivery predictability data 1042. In this example, for each destination node (for example, the name and IP address of the destination node), the delivery predictability for the destination node of the neighboring node, the node having calculated this delivery predictability and the validity time of this delivery predictability are recorded. For example, delivery predictabilities for the node X are received from two neighboring nodes. One of the delivery predictabilities is 0.4, a node having transmitted the delivery predictability is the node B, and the validity time of the delivery predictability is 17:10: 49.500, Nov. 21, 2013. The other delivery predictability is 0.1, a node having transmitted the delivery predictability is the node C, and the validity time of the delivery predictability is 17:11:10.000, Nov. 21, 2013. Herein, the validity time is given by the transmitter and, when the delivery predictability data 1024B is transmitted and received as a SV message by nodes, is equivalent to the validity date of the SV message.

The routing table 1043 is a table for routing in a DTN. FIG. 5 shows an example of the configuration of the routing table 1043. In this example, on the routing table 1043, for each destination node (for example, the name and IP address of the destination node), a next hop node and the IP address of the next hop node are recorded. For example, it is shown that for each of the destination node X and the destination node Z, a next hop node is the node A (the local node) and the IP address of the next hop is 10.0.0.1. Moreover, it is shown that for the destination node Y, a next hop node is the node C and the IP address of the next hop is 10.0.0.3, and it is shown that for the node W, a next hop node is the node B and the IP address of the next hop is 10.0.0.2.

The node list 1044 is a list of nodes as communication destinations. FIG. 6 shows an example of the configuration of the node list 1044. In this example, for each communication destination, the name and IP address of the node are recorded in the node list 1044. For example, it is shown that the IP address of a node whose name is X is 10.0.0.3, the IP address of a node whose name is Y is 10.0.0.2, the IP address of a node whose name is Z is 10.0.0.4, and the IP address of a node whose name is W is 10.0.0.5.

The arithmetic processing part 105 has a microprocessor such as a MPU and a peripheral circuit thereof The arithmetic processing part 105 has a function of loading the program 1041 from the storage part 104 to execute the program 1041 and thereby realizing various processing parts by causing the abovementioned hardware and the program 1041 to cooperate. Major processing parts implemented by the arithmetic processing part 105 are a delivery predictability management part 1051, a DTN communication part 1052, and a user interface part 1053.

The delivery predictability management part 1051 has a function of storing the delivery predictability data 1042 into the storage part 104 and maintaining and managing the delivery predictability data 1042. To be specific, the delivery predictability management part 1051 has the following functions.

The delivery predictability management part 1051 has a function of calculating the delivery predictability for a destination node and storing the calculated delivery predictability as the delivery predictability data 1042A for the destination node calculated by the local node into the storage part 104. Examples of an algorithm for delivery predictability calculation are a calculation method based on neighboring or not, a calculation method based on a route history (Patent Document 1), and the like. However, a delivery predictability calculation method is not limited to them and any calculation method may be used.

Further, the delivery predictability management part 1051 has a function of transmitting delivery predictability calculated by the local node for a neighboring node, and a function of receiving delivery predictability calculated by a neighboring node and transmitted from the neighboring node. The delivery predictability information is transmitted and received as a SV message. Then, the delivery predictability management part 1051 has a function of storing delivery predictability received from a neighboring node as the delivery predictability data 1042B for a destination node calculated by the neighboring node into the storage part 104.

The DTN communication part 1052 has a DTN communication function. To be specific, the DTN communication part 1052 has the following function.

The DTN communication part 1052 has a function of determining a next hop node for each destination node referring to the delivery predictability data 1042, and registering as a routing entry onto the routing table 1043. Below, the function of registering a routing entry will be described in detail referring to FIGS. 4 to 6.

First, in a case where a destination node is the node X, referring to the delivery predictability data 1042A calculated by the local node shown in FIG. 3 and the delivery predictability data 1042B received from the other nodes shown in FIG. 4, the delivery predictability for the node X recorded in the delivery predictability data 1042A is 0.6, and the delivery predictabilities for the node X recorded in the delivery predictability data 1042B are 0.4 and 0.1. Therefore, the largest delivery predictability is 0.6 recorded in the delivery predictability data 1042A. Consequently, the DTN communication part 1052 registers the local node (the node A) having calculated the largest delivery predictability as a next hop node onto the routing table 1043 as shown in FIG. 5.

In a case where a destination node is the node Y, the delivery predictability recorded in the delivery predictability data 1042A shown in FIG. 3 is 0.2, and the delivery predictability recorded in the delivery predictability data 1042B shown in FIG. 4 is 0.5. Therefore, the largest delivery predictability is 0.5 recorded in the delivery predictability data 1042B. Consequently, the DTN communication part 1052 registers the node C having calculated the largest delivery predictability as a next hop node onto the routing table 1043 as shown in FIG. 5.

Further, the DTN communication part 1052 has a function of performing DTN transfer. To be specific, when receiving the IP address of a destination node and transmission data from the user interface part 1053, the DTN communication part 1052 once stores the transmission data in order to start DTN transfer with the local node as a source node. Then, at a moment that a next hop to transfer is found, the DTN communication part 1052 divides the transmission data into bundles and transfers to the next hop. The next hop to transfer is determined by referring to the routing table 1043. For example, in the case of the routing table 1043 shown in FIG. 5, transmission data with the node X or the node Z as a destination node is stored and retained without being transmitted to the other neighboring node. On the other hand, transmission data with the node Y as a destination node is divided into bundles and transferred to the node C. Moreover, transmission data with the node W as a destination node is divided into bundles and transferred to the node B. Herein, transmission and reception of a bundle is performed using a lower layer than a bundle layer (for example, TCP/IP).

Moreover, in a case where the local node is a relay node, the DTN communication part 1052 reconstructs data from bundles received from a neighboring node and once stores the data in the local node. Then, as in a case where the local node is a source node, at a moment that a next hop to transfer is found, the DTN communication part 1052 divides the data into bundles and transfers to the next hop. Furthermore, in a case where the local node is a destination node, the DTN communication part 1052 reconstructs data from bundles received from a neighboring node, and notifies the received data to an upper layer (for example, the application layer).

The user interface part 1053 has a function of causing the user to select a destination node in DTN communication with the local node as a source node on the basis of the delivery predictability data 1042. A specific example of the user interface part 1053 will be shown below.

<Method 1>

The user interface part 1053 causes the screen display part 103 to display a destination selection screen. In displaying, on the destination selection screen, a destination node for which delivery predictability is equal to or more than a threshold and a destination node for which delivery predictability is less than the threshold are displayed separately. Hereinafter, such a selection method will be referred to as a method 1. As a list of destination nodes to be displayed, the node list 1044 stored in the storage part 104 is used. The delivery predictability for a destination node which is written in the node list 1044 and is not written in the delivery predictability data 1042 is set to the minimum value, for example. However, instead of using the node list 1044, a list of destination nodes recorded in the delivery predictability data 1042 may be created and displayed.

Figure 7:
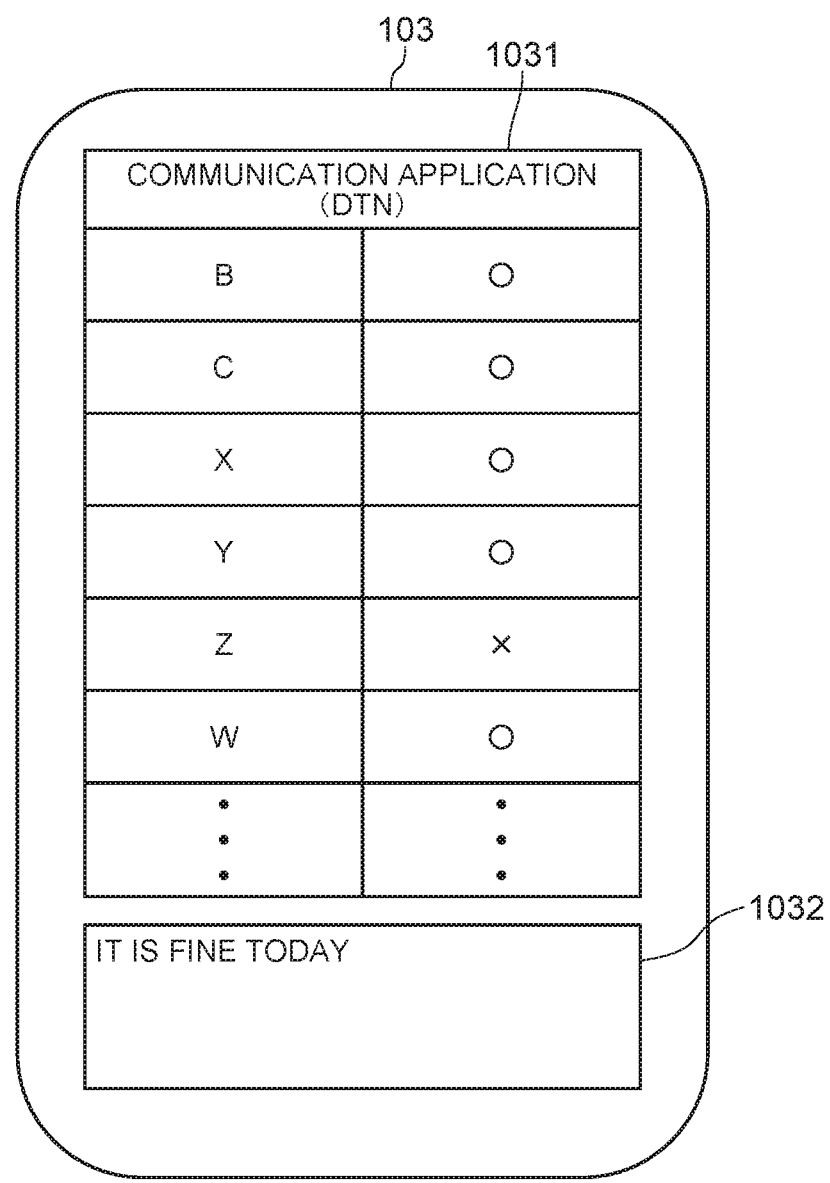
FIG. 7 is a diagram showing an example of the configuration of a destination selection screen displayed on a screen display part of the node according to the first exemplary embodiment of the present invention.

FIG. 7 shows an example of the configuration of the destination selection screen 1031 displayed on the screen display part 103 by the method 1. In this example, for each of the destination nodes written in the node list 1044, either a circle mark showing DTN communication is possible or a cross mark showing DTN communication is impossible or difficult is displayed. For example, let us suppose the threshold is 0.4. In a case where a destination node is the node B, the maximum delivery predictability therefor is 1.0 referring to the delivery predictability data shown in FIGS. 3 and 4, so that the user interface part 1053 determines DTN communication is possible and displays a circle mark. Moreover, in a case where a destination node is the node Z, the maximum delivery predictability therefor is 0.3 referring to the delivery predictability data shown in FIGS. 3 and 4, so that the user interface part 1053 determines DTN communication is impossible or difficult and displays a cross mark. In the example shown in FIG. 7, properness and improperness for DTN communication are presented to the user with a circle mark and a cross mark, but may be presented with characteristics "proper" and "improper." Otherwise, for example, a destination node with a value equal to or more than the threshold may be displayed in blue, and a destination node with a value less than the threshold may be displayed in red. Thus, various modes of separately displaying can be considered.

The user operates the operation input part 102 to select a destination node serving as a communication destination on the destination selection screen 1031 displayed on the screen display part 103. Because a circle mark is displayed on each destination node on the destination selection screen 1031 in a case where delivery predictability is equal to or more than a threshold and a cross mark is displayed when less than the threshold, the user can select a destination node by using it as a selection criterion. The user interface part 1053 notifies the IP address of a selected destination node to the DTN communication part 1052. Moreover, the user interface part 1053 accepts input of transmission data or designation of a file on which transmission data is recorded from the user, and notifies the transmission data to the DTN communication part 1052. As an example, FIG. 7 shows an example that a text edition field 1032 is placed below the destination selection screen 1031. When the user writes a text to transmit in the text edition field 1032 by operating the operation input part 102 and selects any of the destination nodes on the destination selection screen 1031, the IP address of the destination node and the text to transmit are notified to the DTN communication part 1052. A method for selecting a destination node on the destination selection screen 1031 is, for example, a method of performing touch operation on a circle mark spot, but may be any other method.

Figure 8:
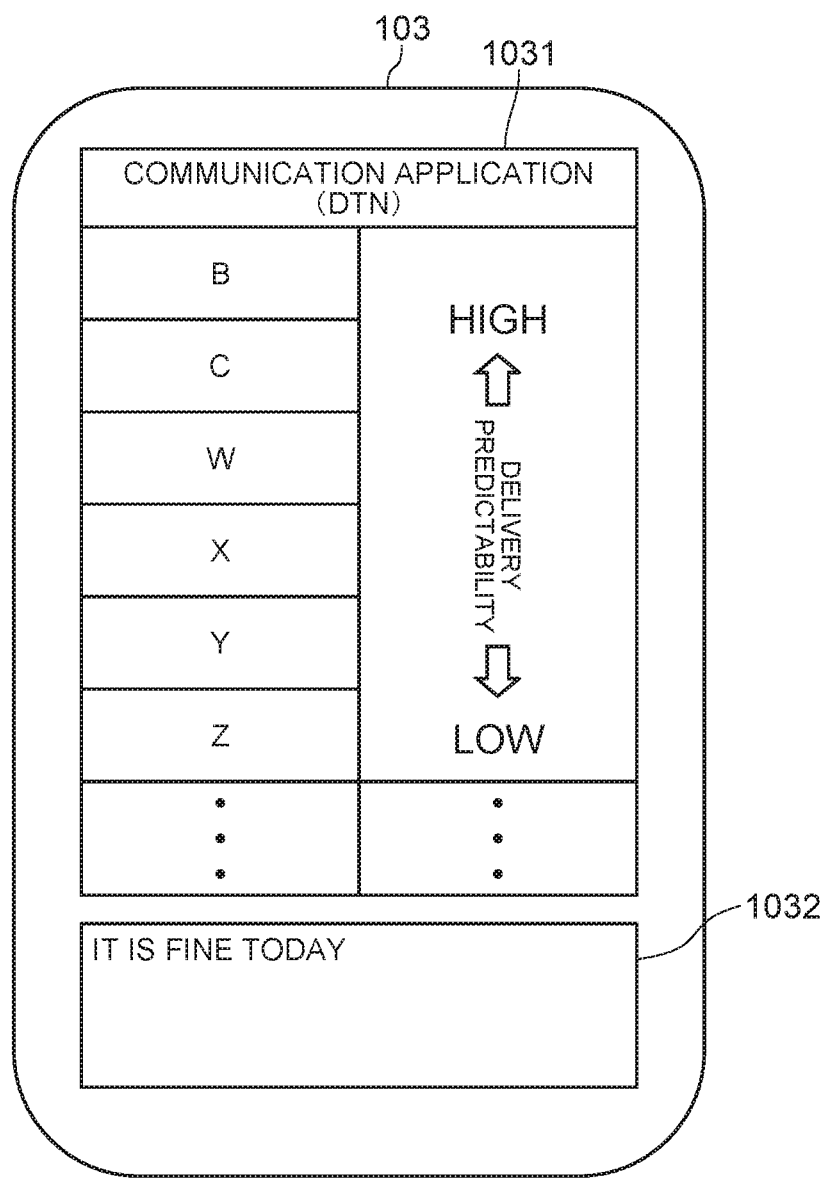
FIG. 8 is a diagram showing another example of the configuration of the destination selection screen displayed on the screen display part of the node according to the first exemplary embodiment of the present invention.

FIG. 8 shows another example of the configuration of the destination selection screen 1031 displayed on the screen display part 103 by the method 1. In this example, the destination nodes written in the node list 1044 are sorted in the decreasing or increasing order of delivery predictabilities and displayed on the destination selection screen 1031. Referring to the delivery predictability data shown in FIGS. 3 and 4, the maximum values of the delivery predictabilities of the destination nodes B and C are 1.0, the maximum value of the delivery predictability of the destination node X is 0.6, the maximum value of the delivery predictability of the destination node Y is 0.5, the maximum value of the delivery predictability of the destination node Z is 0.3, and the maximum value of the delivery predictability of the destination node W is 0.8. Therefore, when sorted in the decreasing order, the destination nodes are displayed in the order of B, C, W, X, Y and Z as shown in FIG. 8.

The user selects a destination node to communicate with on the destination selection screen 1031 displayed on the screen display part 103 by operating the operation input part 102. Because the destination nodes are displayed on the destination selection screen 1031 in the decreasing order of the delivery predictabilities, the user can select a destination node by using it as a selection criterion. The user interface part 1053 notifies the IP address of a selected destination node and transmission data to the DTN communication part 1052.

<Method 2>

The user interface part 1053 causes the screen display part 103 to display a destination selection screen having a list of destination nodes with delivery predictabilities. Hereinafter, this selection method will be referred to as a method 2. As the list of destination nodes to display, the node list 1044 stored in the storage part 104 is used. The delivery predictability of a destination node which is written in the node list 1044 and is not written in the delivery predictability data 1042 is set to the minimum value, for example. However, a list of the destination nodes recorded in the delivery predictability data 1042 may be created and displayed without using the node list 1044.

Figure 9:
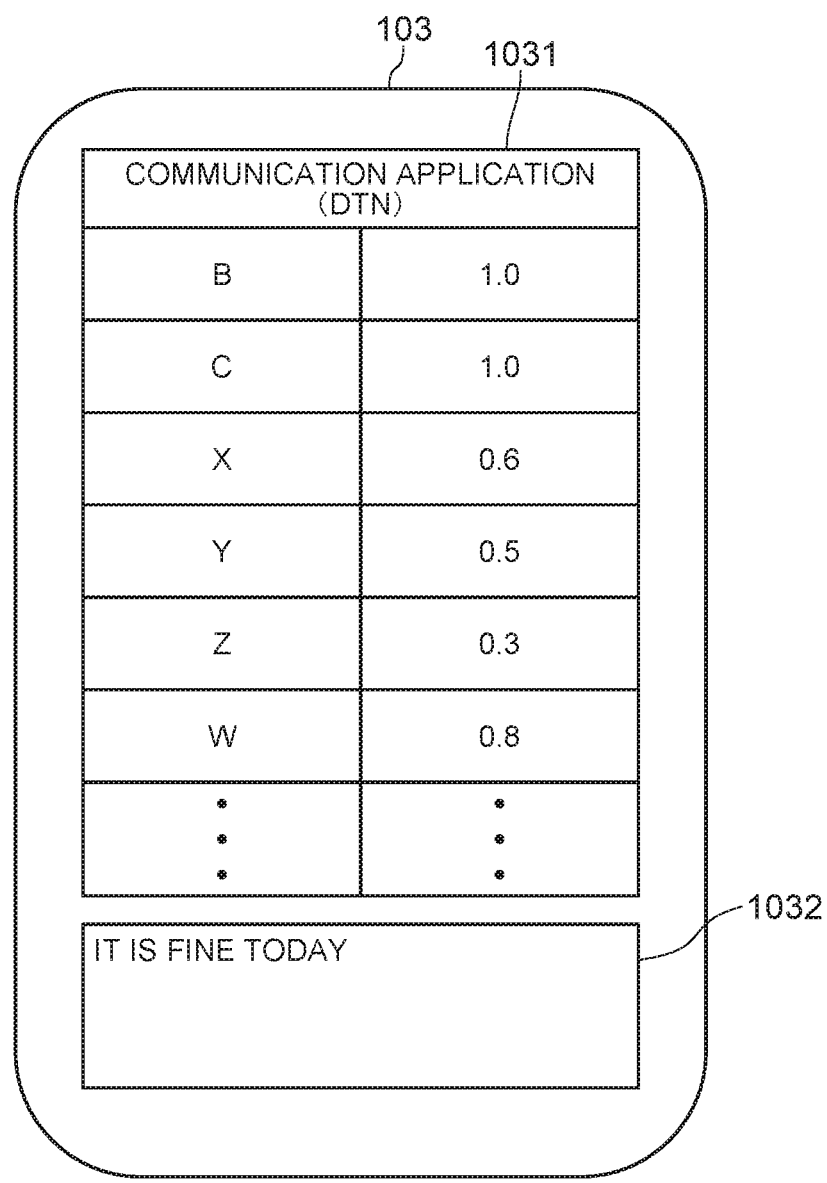
FIG. 9 is a diagram showing another example of the configuration of the destination selection screen displayed on the screen display part of the node according to the first exemplary embodiment of the present invention.

FIG. 9 shows an example of the configuration of the destination selection screen 1031 displayed on the screen display part 103 by the method 2. In this example, for each of the destination nodes written in the node list 1044, a numerical value representing the delivery predictability for the destination node is displayed. In the example shown in FIG. 9, delivery predictability is presented to the user with a numerical value, but may be presented otherwise. For example, a destination node with delivery predictability of 1.0 may be displayed in blue, a destination node with delivery predictability less than 1.0 and equal to or more than 0.7 may be displayed in green, a destination node with delivery predictability less than 0.7 and equal to or more than 0.4 may be displayed in yellow, and a destination node with delivery predictability less than 0.4 may be displayed in red. Thus, various modes of presenting delivery predictabilities to the user can be considered.

The user selects a destination node to communicate with on the destination selection screen 1031 displayed on the screen display part 103 by operating the operation input part 102. Because each destination node is provided with delivery predictability on the destination selection screen 1031, the user can select a destination node by using it as a selection criterion. The user interface part 1053 notifies the IP address of a selected destination node and transmission data to the DTN communication part 1052.

<Method 3>

The user interface part 1053 causes the screen display part 103 to display a list of destination nodes for which delivery predictabilities are equal to more than a threshold. A destination node for which delivery predictability is less than the threshold is not included in the list. Below, this selection method will be referred to as a method 3. As the list of destination nodes to display, the node list 1044 stored in the storage part 104 is used. The delivery predictability for a destination node which is written in the node list 1044 and is not written in the delivery predictability data 1042 is set to the minimum value, for example. To be more specific, the user interface part 1053 extracts a destination node for which the maximum value of delivery predictabilities written in the delivery predictability data 1042 is equal to or more than a threshold from the destination nodes written in the node list 1044, and causes the screen display part 103 to display a list of the extracted destination nodes. However, without using the node list 1044, the user interface part 1053 may extract a destination node for which the maximum value of delivery predictabilities recorded in the delivery predictability data 1042 is equal to or more than a threshold from the delivery predictability data 1042, and display a list of the extracted destination nodes on the screen display part 103.

Figure 10:
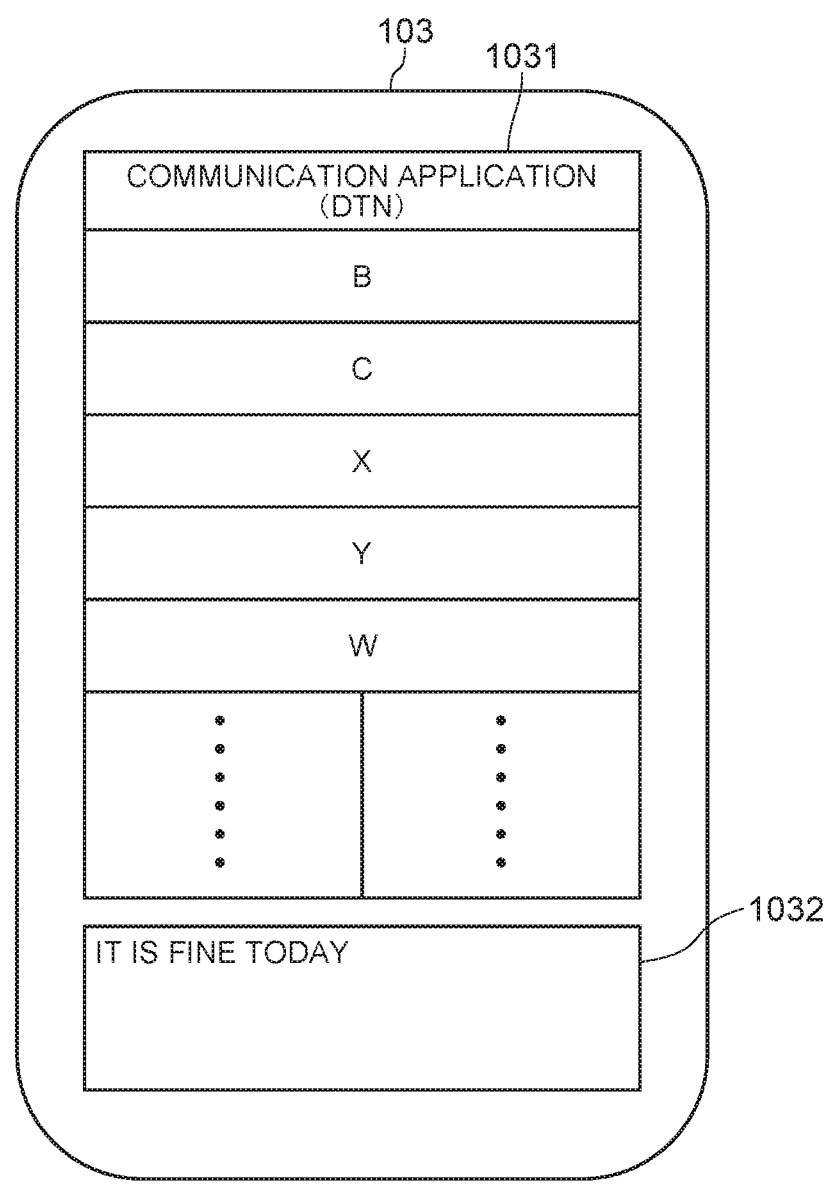
FIG. 10 is a diagram showing another example of the configuration of the destination selection screen displayed on the screen display part of the node according to the first exemplary embodiment of the present invention.

FIG. 10 shows an example of the configuration of the destination selection screen 1031 displayed on the screen display part 103 by the method 3. In this example, of the destination nodes written in the node list 1044, only destination nodes for which delivery predictabilities are equal to or more than a threshold are displayed. For example, assuming the threshold is 0.4, in a case where a destination node is the node B, the maximum delivery predictability therefor is 1.0 referring to the delivery predictability data shown in FIGS. 3 and 4, so that the user interface part 1053 determines DTN communication is possible and displays on the destination selection screen 1031. On the other hand, in a case where a destination node is the node Z, the maximum delivery predictability therefor is 0.3 referring to the delivery predictability data shown in FIGS. 3 and 4, so that the user interface part 1053 determines DTN communication is impossible and does not display on the destination selection screen 1031.

The user selects a destination node to communicate with on the destination selection screen 1031 displayed on the screen display part 103 by operating the operation input part 102. Because only destination nodes with delivery predictabilities equal to or more than a threshold are displayed on the destination selection screen 1031, the user can select a destination node with a delivery predictability of a certain level or more no matter which of the destination nodes the user selects. The user interface part 1053 notifies the IP address of a selected destination node and transmission data to the DTN communication part 1052.

Next, operation of the node device 100 according to this exemplary embodiment will be described.

Figure 11:
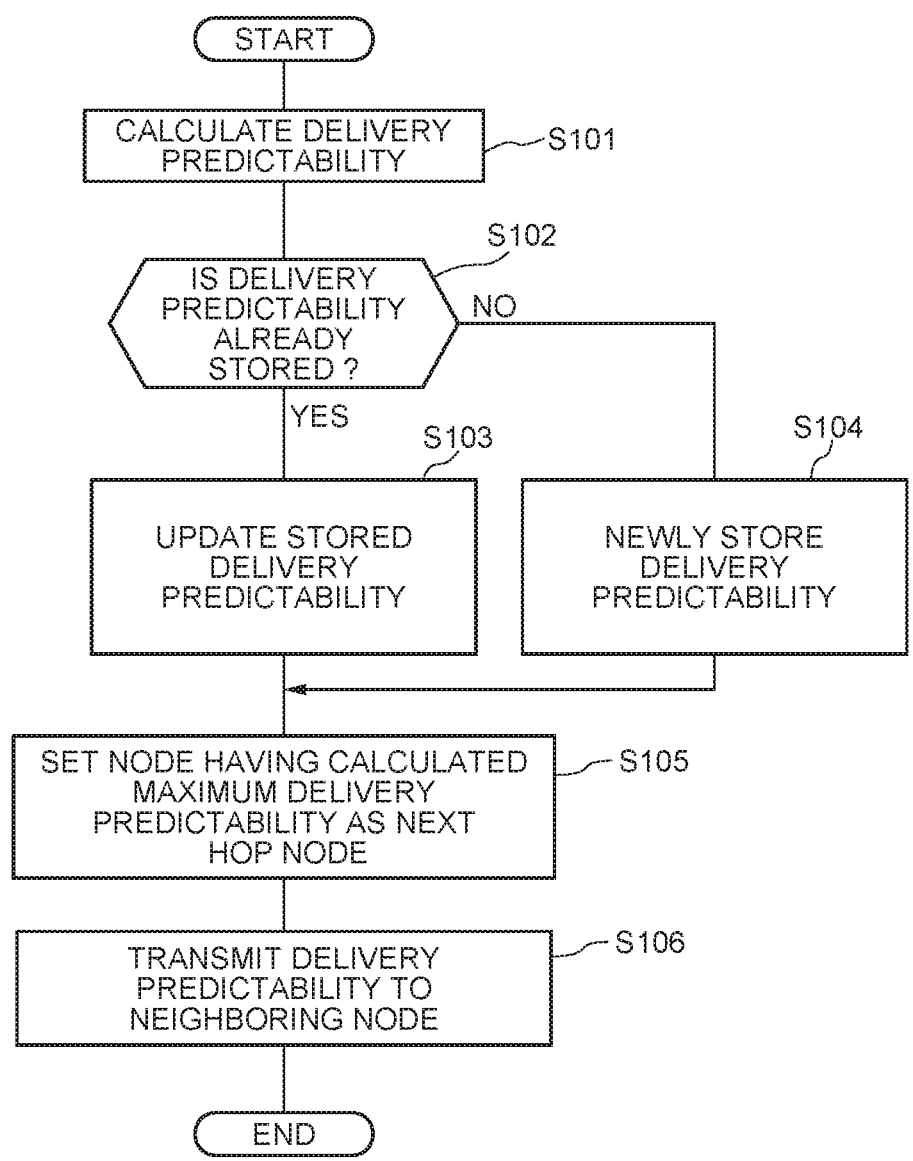
FIG. 11 is a flowchart showing an example of a process executed at constant intervals in the node according to the first exemplary embodiment of the present invention.

The delivery predictability management part 1051 of the node device 100 executes a process shown in FIG. 11 at constant intervals. First, the delivery predictability management part 1051 calculates the delivery predictability for a destination node (step S101). Next, the delivery predictability management part 1051 checks whether or not the delivery predictability for the same destination node is already stored in the delivery predictability data 1042A (step S102). In a case where the delivery predictability for the same destination node is already stored, the delivery predictability management part 1051 updates the delivery predictability in the existing entry of the delivery predictability data 1042A to the calculated delivery predictability (step S103). In a case where the delivery predictability for the same destination node is not stored, the delivery predictability management part 1051 newly stores the calculated delivery predictability (step S104)

Next, control transfers from the delivery predictability management part 1051 to the DTN communication part 1052, and the DTN communication part 1052 updates the routing table 1043 on the basis of the result at step S103 or S104 (step S105). In other words, the DTN communication part 1052 sets the node having calculated the maximum delivery predictability as a next hop node for the destination node.

Next, control returns to the delivery predictability management part 1051 from the DTN communication part 1052, and the delivery predictability management part 1051 broadcasts a SV message containing the delivery predictability to a neighboring node (step S106).

Figure 12:
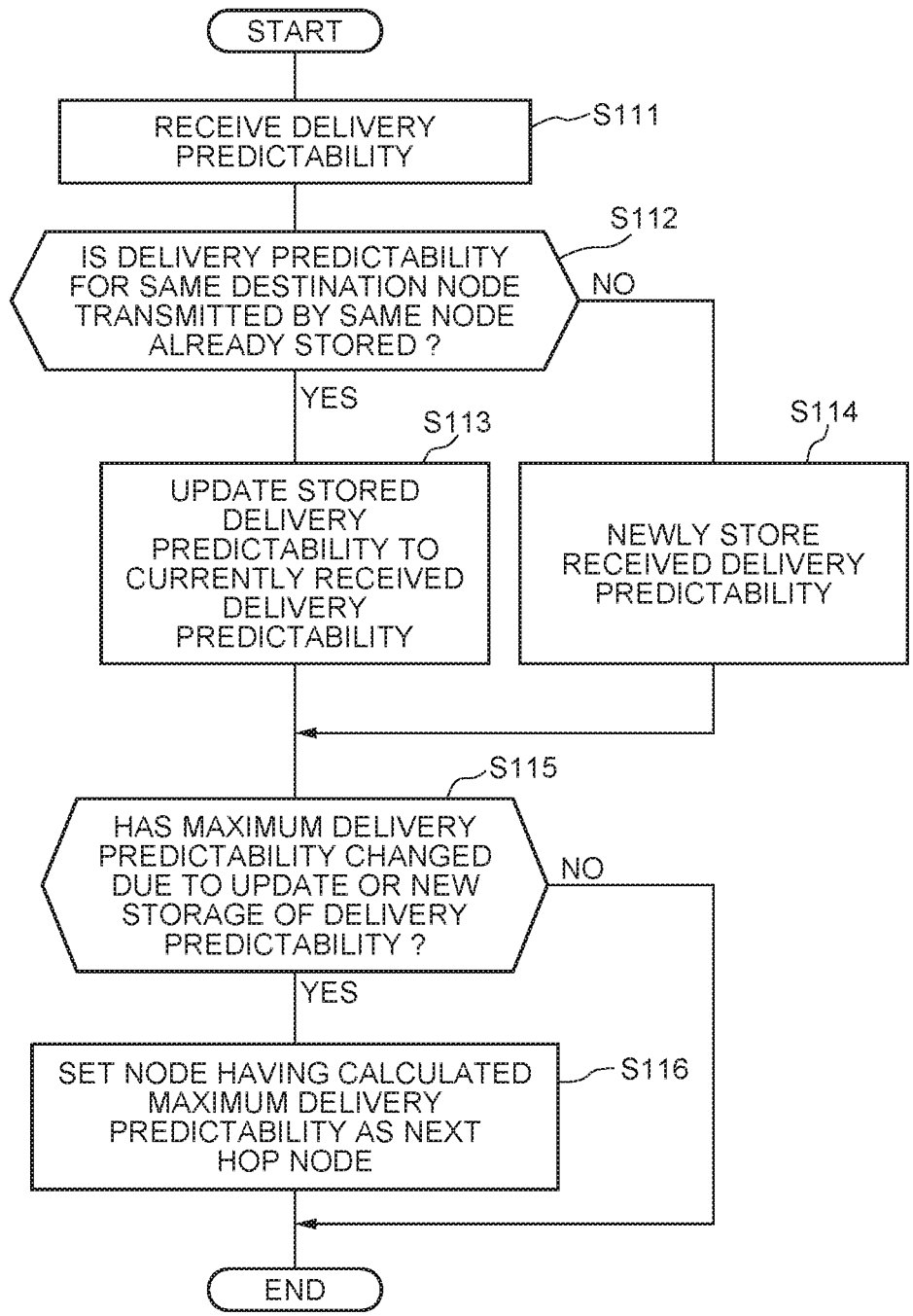
FIG. 12 is a flowchart showing an example of a process executed when the node according to the first exemplary embodiment of the present invention receives delivery predictability from a neighboring node.

FIG. 12 is a flowchart showing operation performed when the node device 100 receives delivery predictability from a neighboring node. First, the delivery predictability management part 1051 receives a SV message containing a list of delivery predictabilities (step S111). Next, the delivery predictability management part 1051 checks whether or not delivery predictability transmitted by the same node is already stored in the delivery predictability data 1042B (step S112). In a case where the delivery predictability for the same destination node from the same node is already stored, the delivery predictability management part 1051 updates the delivery predictability in the existing entry of the delivery predictability data 1042B to the received delivery predictability (step S113). In a case where the delivery predictability for the same destination node from the same node is not stored yet, the delivery predictability management part 1051 newly stores the received delivery predictability into the delivery predictability data 1042B (step S114).

Next, control transfers from the delivery predictability management part 1051 to the DTN communication part 1052, and the DTN communication part 1052 updates the routing table 1043 on the basis of the result at step S113 or S114 (steps S115 and S116). That is to say, the DTN communication part 1052 checks whether or not the maximum delivery predictability has changed with update or new storage of the delivery predictability (step S115). In a case where the maximum delivery predictability has changed, the DTN communication part 1052 sets the node for which the maximum delivery predictability has been calculated as a next hop node for the destination node (step S116).

Next, operation executed when the node device 100 performs DTN communication as a source node will be described.

Figure 13:
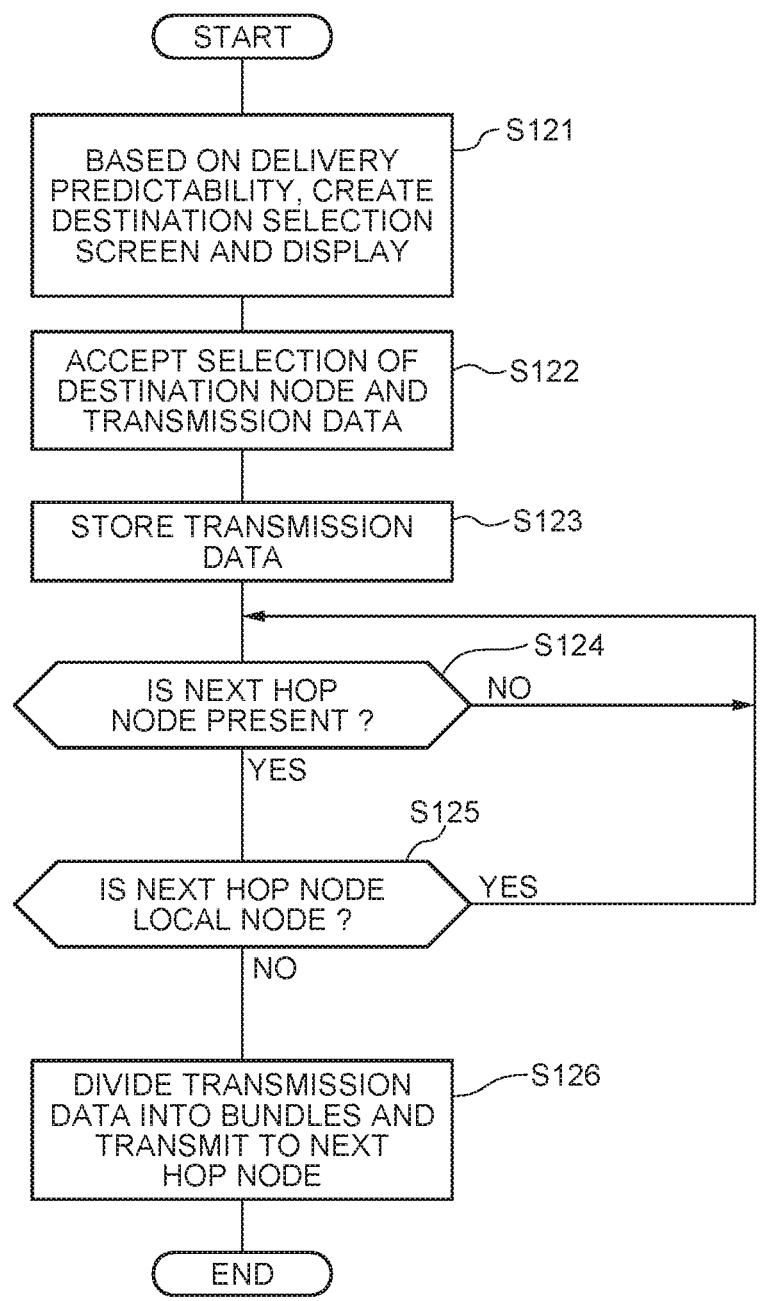
FIG. 13 is a flowchart showing an example of a process executed by a user interface part of the node according to the first exemplary embodiment of the present invention.

When the DTN communication function is selected by the user with the operation input part 102, the user interface part 1053 of the node device 100 initiates execution of a process shown in FIG. 13. First, the user interface part 1053 retrieves the delivery predictability data 1042 and the node list 1044 from the storage part 104, and creates the destination selection screen 1031 as described referring to FIGS. 7 to 10 and displays on the screen display part 103 (step S121). Next, the user interface part 1053 accepts selection input of a destination node and input of transmission data from the user (step S122). Then, the user interface part 1053 notifies the IP address of the destination node selected by the user and the transmission data to the DTN communication part 1052.

The DTN communication part 1052 stores the notified transmission data (step S123). Next, the DTN communication part 1052 checks whether or not a next hop node for the destination node is present referring to the routing table 1043 (step S124). In a case where a next hop node is present, the DTN communication part 1052 determines whether or not it is the local node (step S125). In a case where a next hop node for the destination node is not the local node, the DTN communication part 1052 divides the transmission data into bundles and transmits to the next hop node (step S126). In a case where a next hop node is not present, and in a case where a next hop node is present but it is not the local node, the DTN communication part 1052 returns to step S124 to continue the process.

Figure 14:
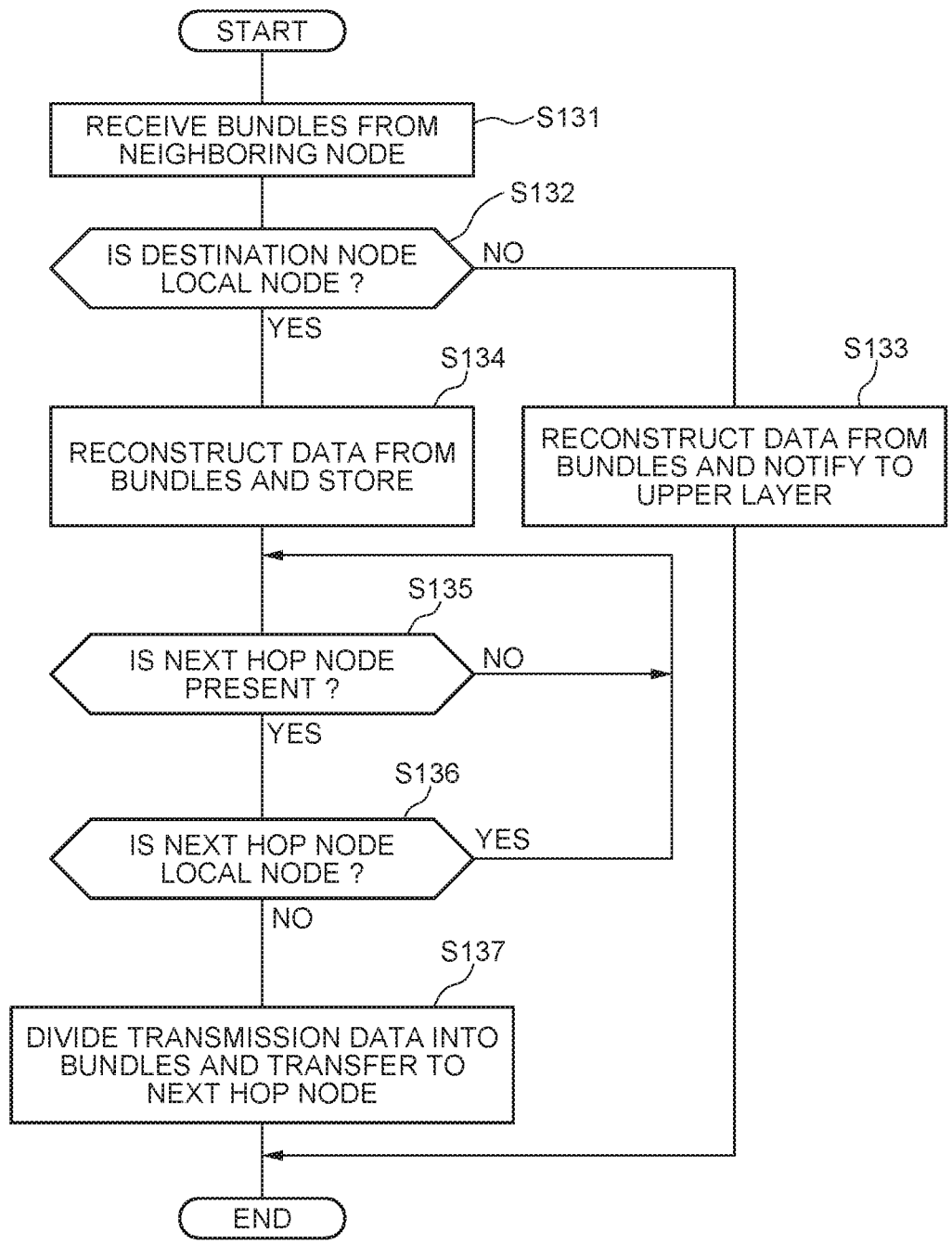
FIG. 14 is a flowchart showing an example of operation performed when the node according to the first exemplary embodiment of the present invention receives a bundle from a neighboring node.

Next, operation performed when the node device 100 receives bundles from a neighboring node will be described referring to a flowchart of FIG. 14.

When receiving bundles from a neighboring node (step S131), the DTN communication part 1052 of the node device 100 determines whether or not the destination node of the bundles is the local node (step S132). In a case where the destination node is the local node, the DTN communication part 1052 reconstructs data from the bundles, and notifies to an upper layer (step S133).

On the other hand, in a case where the destination node is not the local node, the DTN communication part 1052 reconstructs data from the bundles and stores (step S134). Next, the DTN communication part 1052 checks whether or not a next hop node for the destination node is present referring to the routing table 1043 (step S135). In a case where a next hop node is present, the DTN communication part 1052 determines whether or not it is the local node (step S136). In a case where the next hop node for the destination node is not the local node, the DTN communication part 1052 divides transmission data into bundles and transmits to the next hop node (step S137). In a case where a next hop node is not present, and in a case where a next hop node is present and is the local node, the DTN communication part 105 returns to step S135 to continue the process.

Thus, according to this exemplary embodiment, the user of the node device 100 can select a destination node on the basis of delivery predictability in performing DTN communication. This is because the node device has the user interface part 1053 which selects a destination node for DTN communication with the local node as a source node, on the basis of delivery predictability for each destination node.

[Second Exemplary Embodiment]

Figure 15:
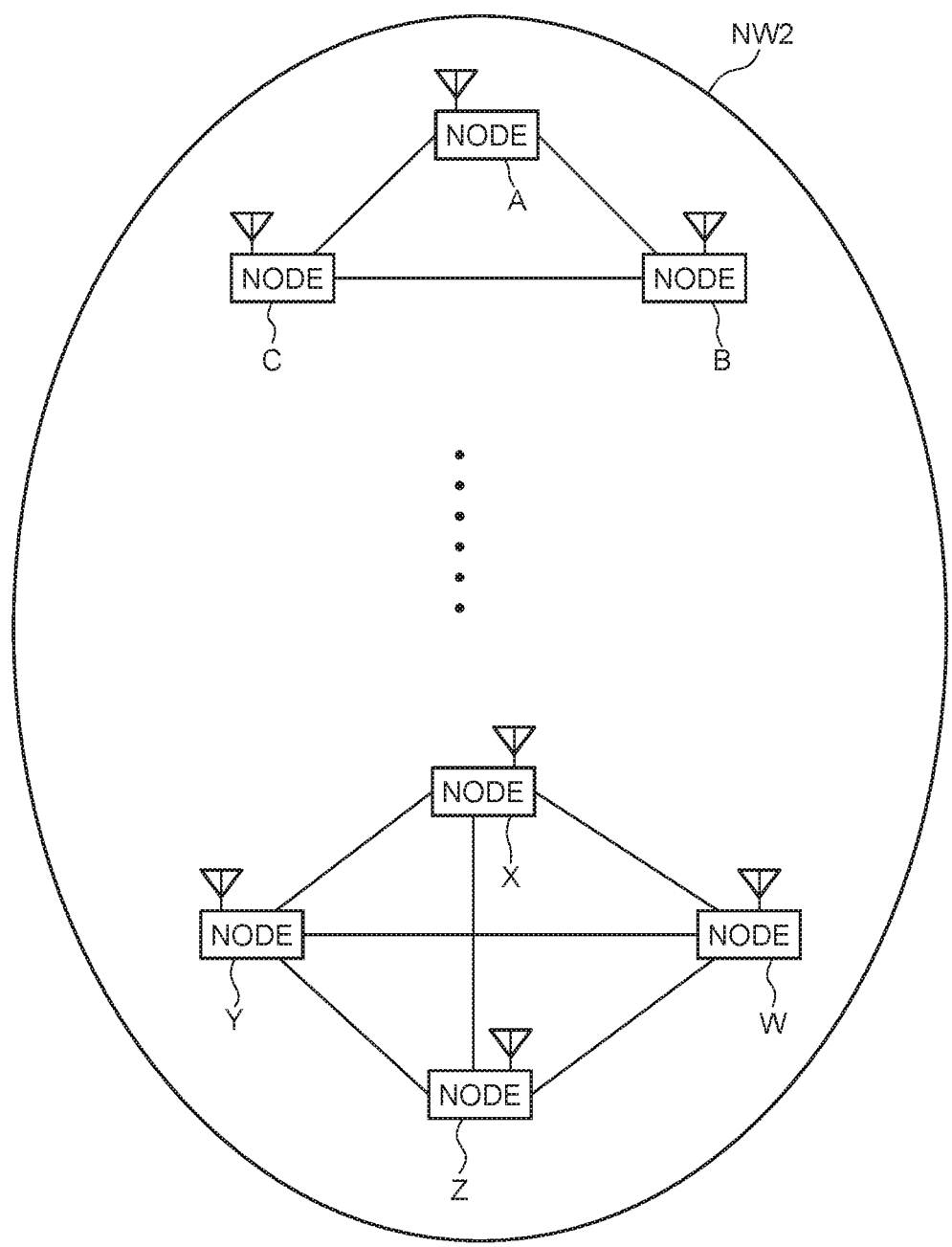
FIG. 15 is a diagram showing an example of the configuration of a communication network system according to a second exemplary embodiment of the present invention.

Referring to FIG. 15, a communication network system NW2 according to a second exemplary embodiment of the present invention is a network which has a wireless ad hoc network function and a mobile phone network function in addition to the DTN function. The communication network system NW2 is configured by a node A, a node B, a node C, ..., a node W, a node Y and a node Z. In the example shown by FIG. 15, because direct routes are present between the nodes A, B and C, a small-scale ad hoc network is formed by the three nodes. Moreover, because direct routes are present between the nodes X, Y, Z and W, another small-scale ad hoc network is formed by the four nodes. The number and arrangement of the nodes may be any number and arrangement, and the nodes A to Z can move.

Figure 16:
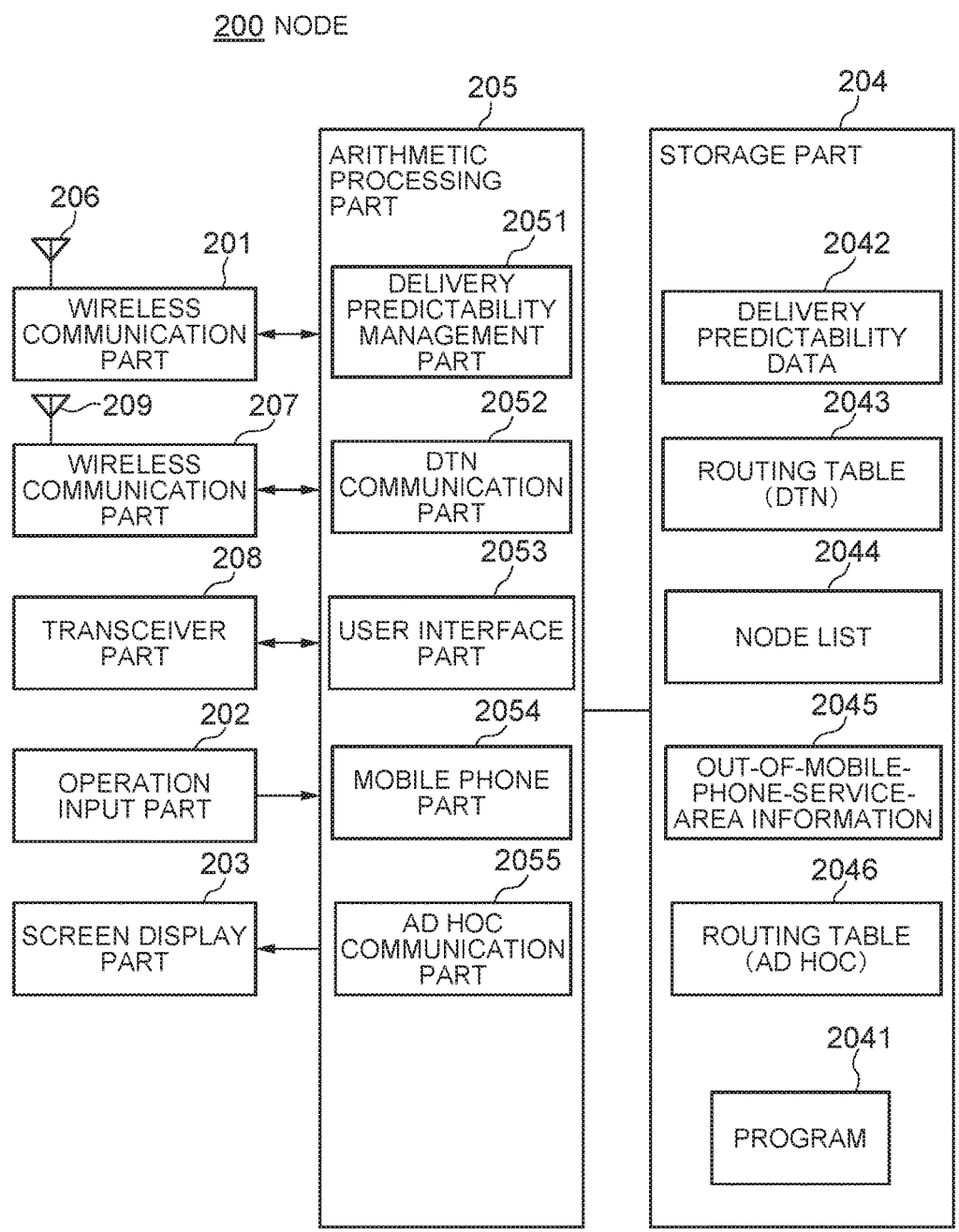
FIG. 16 is a block diagram showing an example of the configuration of a node according to the second exemplary embodiment of the present invention.

FIG. 16 shows the configuration of a node 200 which can be used as each of the nodes A to Z. The node 200 has wireless communication parts 201 and 207, an operation input part 202, a screen display part 203, a storage part 204, an arithmetic processing part 205, antennas 206 and 209, and a transceiver part 208. Among them, the wireless communication part 201, the operation input part 202, the screen display part 203 and the antenna 206 have the same functions as the wireless communication part 101, the operation input part 102, the screen display part 103 and the antenna 106 of the node 100 according to the first exemplary embodiment of the present invention shown in FIG. 2.

The wireless communication part 207 has a function of exchanging communication messages by radio with a base station of a mobile phone network through the antenna 209.

The transceiver 208 part includes a transmitter and a receiver which are for performing voice communication.

The storage part 204 is configured with a storage device such as a ROM, a RAM and a hard disk, and stores a program 2041 and process information. The program 2041 is a program which is loaded and executed by the arithmetic processing part 205 to implement various kinds of processing parts. As major process information stored by the storage part 204 is delivery predictability data 2042, a routing table 2043, a node list 2044, out-of-mobile-phone-service-area information 2045, and a routing table 2046. Among them, the delivery predictability data 2042 and the routing table 2043 have the same functions as the delivery predictability data 1042 and the routing table 1043 of the node 100 according to the first exemplary embodiment of the present invention shown in FIG. 2.

The node list 2044 is a list of nodes as communication destinations. FIG. 17 shows an example of the configuration of the node list 2044. In this example, for each of the communication destinations, the name, IP address and mobile phone number of the node are recorded on the node list 2044. For example: the IP address of a node with a name X is 10.0.0.4 and the mobile phone number of the node X is 070-XXXX-0004; the IP address of a node with a name Y is 10.0.0.5 and the mobile phone number of the node Y is 070-XXXX-0005; the IP address of a node with a name Z is 10.0.0.6 and the mobile phone number of the node Z is 070-XXXX-0006; and the IP address of a node with a name W is 10.0.0.7 and the mobile phone number of the node W is 070-XXXX-0007.

The out-of-mobile-phone-service-area information 2045 is data representing whether or not the local node is out of a mobile phone service.

Figure 18:
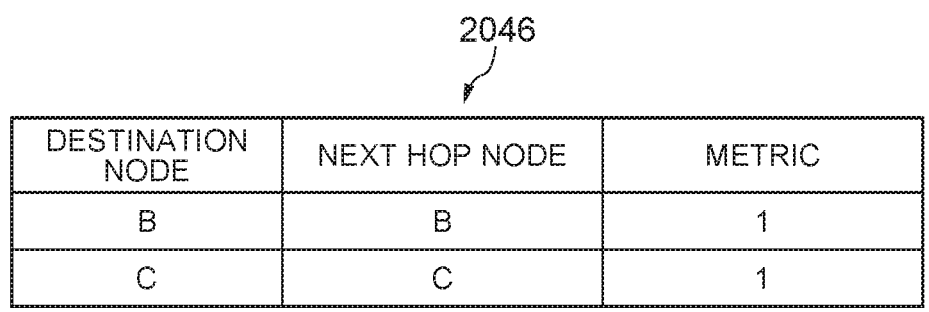
FIG. 18 is a diagram showing an example of the configuration of a routing table for ad hoc communication of the node according to the second exemplary embodiment of the present invention.

The routing table 2046 is a table for routing of an ad hoc network. FIG. 18 shows an example of the configuration of the routing table 2046. In this example, for each destination node (for example, the name or IP address of the destination node), a next hop node (for example, the IP address) and a metric are recorded on the routing table 2046. For example, regarding the destination node B, it is shown that the next hop node is the node B and the metric is 1. Moreover, regarding the destination node C, it is shown that the next hop node is the node C and the metric is 1. Destination nodes recorded on the routing table 2045 are only the nodes B and C.

The arithmetic processing part 205 has a microprocessor such as a MPU and a peripheral circuit thereof, and has a function of loading the program 2041 from the storage part 204 to execute and thereby realizing various kinds of processing parts by causing the abovementioned hardware and the program 2041 to work in cooperation. As major processing parts implemented by the arithmetic processing part 205 are a delivery predictability management part 2051, a DTN communication part 2052, a user interface part 2053, a mobile phone part 2054, and an ad hoc communication part 2055. Among them, the delivery predictability management part 2051 and the DTN communication part 2052 have the same functions as the delivery predictability management part 2051 and the DTN communication part 2052 of the node 100 according to the first exemplary embodiment of the present invention shown in FIG. 2.

The mobile phone part 2054 has a function of, on the basis of the strength of a radio wave from a base station received by the wireless communication part 207, determining whether or not the local node is out of a mobile phone service area and storing the determination result as the out-of-mobile-phone-service-area information 2045 into the storage part 204. Moreover, the mobile phone part 2054 has a function of performing voice communication with another node via a base station of a mobile phone network.

The ad hoc communication part 2055 has an ad hoc communication function. To be specific, the ad hoc communication part 2055 has a function as shown below.

The ad hoc communication part 2055 has a function of, by using a proactive-type routing protocol such as OLSR (Optimized Link State Routing), regularly exchanging control information about a route with a neighboring node, and creating and updating the routing table 2045. Moreover, the ad hoc communication part 2055 has a function of performing voice communication and message communication with another node through an ad hoc network.

The user interface part 2053 has a function of, on the basis of the delivery predictability data 2042, causing the user to select a destination node for DTN communication with the local node as a source node. This function is the same as that of the user interface part 1053 of the node 100 according to the first exemplary embodiment of the present invention shown in FIG. 2.

Moreover, the user interface part 2053 has a function of, on the basis of the routing table 2046, causing the user to select a destination node for ad hoc communication with the local node as a source node. To be specific, the user interface part 2053 causes the screen display part 203 to display a destination selection screen having a list of destination nodes capable of ad hoc communication. As the list of destination nodes to be displayed, the node list 2044 stored in the storage part 204 is used. A destination node which is written in the node list 2044 and also written in the routing table 2046 is determined to be capable of ad hoc communication, and a destination node which is written in the node list 2044 but is not written in the routing table 2046 is determined to be incapable of ad hoc communication. Meanwhile, without using the node list 2044, a list of destination nodes recorded on the routing table 2046 may be created and displayed.

Furthermore, the user interface part 2053 has a function of, on the basis of the out-of-mobile-phone-service-area information 2045, causing to select a destination node of a mobile phone with the local node as a source. To be specific, the user interface part 2053 causes the screen display part 203 to display a destination selection screen having the node list 2044 stored in the storage part 204. Then, in a case where the out-of-mobile-phone-service-area information 2045 indicates out of area, the destination node is determined to be incapable of mobile phone communication. In a case where the out-of-mobile-phone-service-area information 2045 does not indicate out of area, the destination node is determined to be capable of mobile phone communication.

Figure 19:
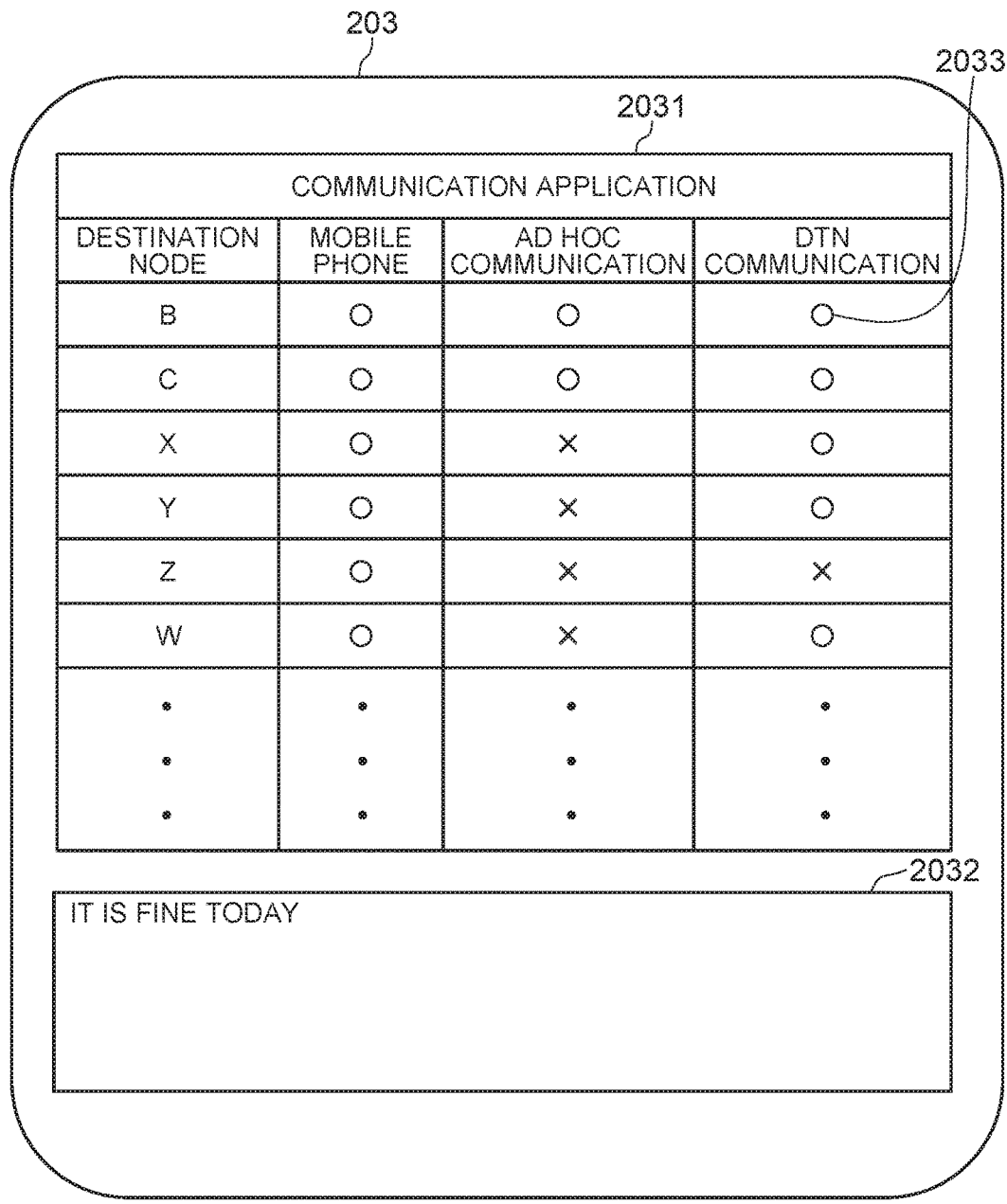
FIG. 19 is a diagram showing an example of the configuration of a destination selection screen displayed on a screen display part of the node according to the second exemplary embodiment of the present invention.

FIG. 19 shows an example of the configuration of the destination selection screen 2031 displayed on the screen display part 203. In this example, for each destination node written in the node list 2044, capability of mobile phone communication via a base station, capability of ad hoc communication and capability of DTN communication are each indicated by a circle mark when capable and indicated by a cross mark when incapable. The example shown in FIG. 19 represents a case where the out-of-mobile-phone-service-area information 2045 does not represent out of area, and shows all the destination nodes are capable of mobile phone communication (with circle marks). Moreover, the example shown in FIG. 19 represents a case where the routing table 2046 of the local node (the node A) is as shown in FIG. 18, and shows only the node B and the node C are capable of ad hoc communication (with circle marks) and the other nodes are incapable of ad hoc communication (with cross marks). Capability of DTN communication in FIG. 19 is the same as on the destination selection screen 1031 shown in FIG. 8 of the node 100 according to the first exemplary embodiment of the present invention. In the example of FIG. 19, capability of mobile phone communication, ad hoc communication and DTN communication is presented to the user with a circle mark and a cross mark, but may be displayed with characters of "proper" and "improper." Otherwise, a destination node capable of communication may be displayed in blue and a destination node incapable of communication may be displayed in red. Thus, various modes of separately displaying can be considered.

The user operates the operation input part 202 to select a communication type and a destination node on the destination selection screen 2031 displayed on the screen display part 203. Because capability of communication for each communication type is displayed with a circle mark or a cross mark for each destination node on the destination selection screen 2031, the user can select a destination node by using it as a selection criterion. Selection input can be performed by, for example, touching the spot of a circle mark. For example, by touching the spot of a circle mark represented by reference numeral 2033 in FIG. 19, the user can select DTN as a communication type and the node B as a destination node. The user interface part 2053 notifies information (the mobile phone number and IP address) of the destination node selected by the user to the mobile phone part 2054, the ad hoc communication part 2055 or the DTN communication part 2052 for controlling communication of the type selected by the user. Moreover, the user interface part 2053 accepts input of transmission data or designation of a file from the user, and notifies the transmission data to the ad hoc communication part 2054 or the DTN communication part 2052. As an example, FIG. 19 shows arrangement of the text edition field 2032 below the destination selection screen 2031. When the user operates the operation input part 202 to write a text to transmit in the text edition field 2032, and selects ad hoc communication or DTN communication and also any of the destination nodes on the destination selection screen 2031, the IP address of the destination node and the text to transmit are notified to the ad hoc communication part 2055 or the DTN communication part 2052.

In addition to the function of the destination selection screen 1031 shown in FIG. 7, the destination selection screen 2031 shown in FIG. 19 is provided with a destination selection function for mobile phone communication and ad hoc communication. Likewise, the destination selection function for mobile phone communication and ad hoc communication may be added to the destination selection screen 1031 shown in FIGS. 8 to 10.

Next, the operation of the node 200 according to this exemplary embodiment will be described. Of the operation of the node 200 according to this exemplary embodiment, the operation of the delivery predictability management part 2051 and the DTN communication part 2052 is the same as the operation of the delivery predictability management part 1051 and the DTN communication part 1052 of the node 100 according to the first exemplary embodiment of the present invention. Below, the operation of the mobile phone part 2054, the ad hoc communication part 2055 and the user interface part 2053 will be described.

The mobile phone part 2054 determines at constant intervals whether or not the local node is out of area of the mobile phone service on the basis of the strength of a radio wave from a base station received by the wireless communication part 207, or the like. Then, in a case where the local node is out of area of the mobile phone service, the mobile phone part 2054 stores the out-of-mobile-phone-service-area information 2045 representing that into the storage part 204. Moreover, the mobile phone part 2054 makes a mobile-phone call to a destination node from the local node in accordance with an instruction from the user interface part 2053, and implements voice communication using the transceiver part 208 with the destination node. Furthermore, when receiving a call from a mobile phone network through the wireless communication part 207, the mobile phone part 2054 notifies reception of the call to the user and, when the user responds, implements voice communication using the transceiver part 208 with the caller.

The ad hoc communication part 2055 regularly exchanges control information about a route with a neighboring node, and creates the routing table 2046 and stores it into the storage part 204. Moreover, the ad hoc communication part 2055 makes a call for voice communication and message communication to a destination node from the local node in accordance with an instruction from the user interface part 2053 and, when making a call for voice communication, implements voice communication using the transceiver part 208 with the destination node. Furthermore, when receiving data from a neighboring node through the wireless communication part 201 via an ad hoc network, the ad hoc communication part 2055 notifies data for the local node to the upper layer (the application layer), whereas transfers data for another node to another neighboring node.

Figure 20:
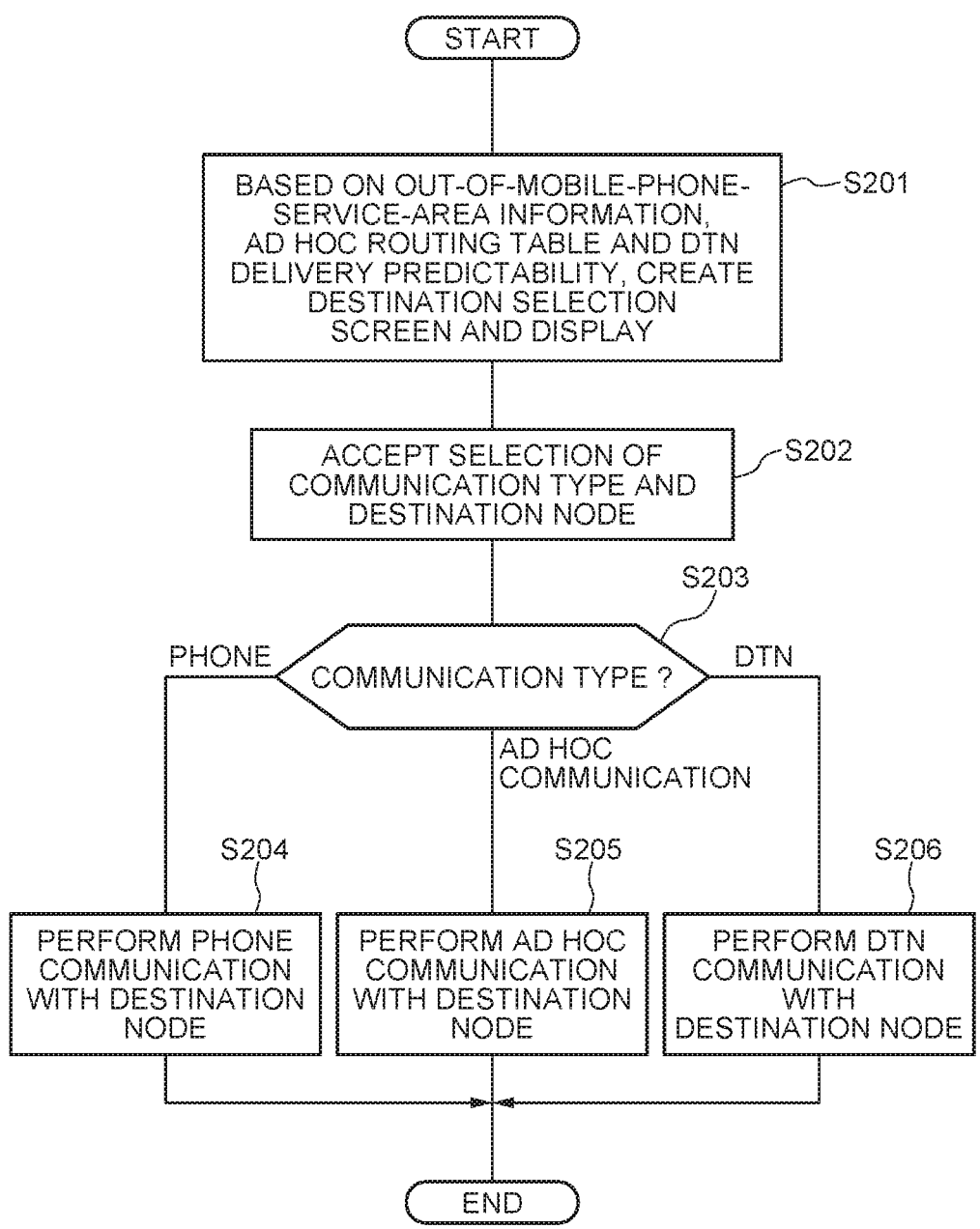
FIG. 20 is a flowchart showing an example of a process executed by a user interface part of the node according to the second exemplary embodiment of the present invention.

When a communication function is selected by the user through the operation input part 202, the user interface part 2053 starts execution of a process shown in FIG. 20. First, the user interface part 2053 retrieves the delivery predictability data 2042, the node list 2044, the out-of-mobile-phone-service-area information 2045 and the routine table 2046 from the storage part 204, and creates the destination selection screen 2031 as described referring to FIG. 19 and causes the screen display part 203 to display it (step S201). Next, the user interface part 2053 accepts, from the user, selection input of a communication type and a destination node and, in the case of message communication, also accepts input of transmission data (step S202). Then, the user interface part 2053 determines whether the communication type selected by the user is mobile phone communication, ad hoc communication or DTN communication (step S203).

In a case where the communication type selected by the user is mobile phone communication, the user interface part 2053 acquires from the node list 2044 a mobile phone number corresponding to a destination node selected by the user on the destination selection screen 2031, and asks the mobile phone part 2054 to call the mobile phone number. In response to this, the mobile phone part 2054 makes a call through the wireless communication part 207 via a base station and, when the receiver responds, allows a talk therebetween (step S204).

Further, in a case where the communication type selected by the user is ad hoc communication, the user interface part 2053 acquires from the node list 2044 an IP address number corresponding to a destination node selected by the user on the destination selection screen 2031, and asks the ad hoc communication part 2055 to communicate to the IP address. In response to this, the ad hoc communication part 2055 performs communication between the local node and the destination node via an ad hoc network (step S205). In the communication, the ad hoc communication part 2055 determines a next hop node to transfer data by using the routing table 2046, and transmits the data to the determined next hop node.

Furthermore, in a case where the communication type selected by the user is DTN communication, the user interface part 2053 and the DTN communication part 2052 perform the same operation as the user interface part 1053 and the DTN communication part 1052 of the node 100 according to the first exemplary embodiment of the present invention, and starts DTN communication with the local node as a source node.

Thus, according to this exemplary embodiment, the user of the node device 200 can select a destination node on the basis of delivery predictability when performing DTN communication. This is because the node device has the user interface part 2053 which causes the user to select a destination node for DTN communication with the local node as a source node on the basis of delivery predictability for each destination node.

Further, according to this exemplary embodiment, the user of the node device 200 can recognize a destination node with which the node device can perform ad hoc communication, on the same screen as a destination selection screen for selecting a DTN communication destination node. This is because the user interface part 2053 causes the user to select a destination node for ad hoc communication with the local node as a source node on the destination selection screen, on the basis of the routing table 2046 created based on a proactive-type routing protocol.

Furthermore, according to this exemplary embodiment, the user of the node device 200 can recognize a destination node to which the node device can make a mobile-phone call, on the same screen as a destination selection screen for selecting a DTN communication destination node. This is because the user interface part 2053 causes the user to select a destination node for a mobile phone call with the local node as a caller on the destination selection screen on the basis of whether or not the local node is out of area of the mobile phone service.

The present invention is based upon and claims the benefit of priority from Japanese patent application No. 2014-002141, filed on Jan. 9, 2014, the disclosure of which is incorporated herein in its entirety by reference.

INDUSTRIAL APPLICABILITY

The present invention can be utilized when a mobile phone terminal, a mobile terminal and the like perform voice communication, message communication and the like with a terminal by using wireless communication.

DESCRIPTION OF REFERENCE NUMERALS

NE1 communication network system
A to Z node
100 node
101 wireless communication part
102 operation input part
103 screen display part
104 storage part
105 arithmetic processing part
1041 program
1042 delivery predictability data
1043 routing table
1044 node list
1051 delivery predictability management part
1052 DTN communication part
1053 user interface part

The invention claimed is:
1. A node device for delay tolerant network (DTN) communication and ad hoc communication, the node device comprising:
a wireless transceiver configured to transmit and receive a communication message wirelessly with another node device;
an operation input configured to detect an operation;
a display configured to display a screen;

storage configured to store a node list in which a name and an IP address of a destination node are described; and a processor connected to the wireless transceiver, the operation input, the screen display unit, and the storage unit, wherein the processor is configured to:

store delivery predictabilities for each of destination nodes, the delivery predictabilities including a delivery predictability for the destination node calculated by a local node and a delivery predictability for the destination node calculated by a neighboring node, for each name of the destination node described in the node list;

determine a next hop node with respect to each destination node based on the delivery predictabilities for each of the destination nodes, and create a routing table for the DTN communication in which a name of the destination node and a name of the next hop node are described;

determine a next hop node with respect to each destination node based on a proactive-type routing protocol, and create a routing table for the ad hoc communication in which a name of the destination node and a name of the next hop node are described;

allow selection of a destination node for DTN communication with the local node as a source node based on the delivery predictabilities for each of the destination nodes, and allow selection of a destination node for the ad hoc communication with the local node as a source node based on the routing table, and display a destination selection screen on the display, the destination selection screen being a screen for inputting transmission data and being configured to allow selection of a destination node for the DTN communication, selection of a destination node for the ad hoc communication, and input of the transmission data, to be performed on the same screen;

wherein when input of the transmission data and selection of the destination node for the DTN communication are performed on the destination selection screen, the processor is notified of the input transmission data and the selected destination node for the DTN communication, and when input of the transmission data and selection of the destination node for the ad hoc communication are performed on the destination selection screen, the processor is notified of the input transmission data and the selected destination node for the ad hoc communication, the processor is configured to refer to the routing table for the DTN communication to select a next hop node to be used for transferring the transmission data to the notified destination node, and transmits the transmission data to the next hop node via the transceiver, and the processor is configured refer to the routing table for the ad hoc communication to select a next hop node to be used for transferring the transmission data to the notified destination node, and transmits the transmission data to the next hop node via the transceiver.

2. The node device according to claim 1, wherein the processor is further configured to display a destination selection screen, the destination selection screen displaying the destination node with the delivery predictability equal to or more than a threshold and the destination node with the delivery predictability less than the threshold so as to be distinguished from each other.

3. The node device according to claim 2, wherein the destination selection screen displays the destination nodes arranged in decreasing or increasing order of the delivery predictabilities.

4. The node device according to claim 2, wherein the destination selection screen displays the destination node with the delivery predictability equal to or more than the threshold and the destination node with the delivery predictability less than the threshold in different display forms from each other.

5. The node device according to claim 1, wherein the processor is further configured to display a destination selection screen, the destination selection screen having a list of the destination nodes provided with the delivery predictabilities.

6. The node device according to claim 1, wherein the processor is further configured to display a destination selection screen, the destination selection screen having a list of the destination nodes with the delivery predictabilities equal to or more than a threshold.

7. The node device according to claim 1, wherein the processor is further configured to:

implement voice communication between the local node and the destination node through a base station of a mobile phone network, wherein the processor is configured to allow selection of a destination node for a mobile phone call with the local node as a caller, based on whether or not the local node is out of a mobile phone service area.

8. A communication network system comprising a plurality of nodes for delay tolerant network (DTN) communication and ad hoc communication, wherein each of the nodes comprises:

a wireless transceiver configured to transmit and receive a communication message wirelessly with another node device;

an operation input configured to detect an operation;

a display configured to display a screen;

storage configured to store a node list in which a name and an IP address of a destination node are described; and a processor connected to the wireless transceiver, the operation input, the screen display unit, and the storage unit, wherein the processor is configured to:

store delivery predictabilities for each of destination nodes, the delivery predictabilities including a delivery predictability for the destination node calculated by a local node and a delivery predictability for the destination node calculated by a neighboring node, for each name of the destination node described in the node list;

determine a next hop node with respect to each destination node based on the delivery predictabilities for each of the destination nodes, and create a routing table for the DTN communication in which a name of the destination node and a name of the next hop node are described;

determine a next hop node with respect to each destination node based on a proactive-type routing protocol, and create a routing table for the ad hoc communication in which a name of the destination node and a name of the next hop node are described;

allow selection of a destination node for DTN communication with the local node as a source node based on the delivery predictabilities for each of the destination nodes; and allow selection of a destination node for the ad hoc communication with the local node as a source node based on the routing table, and display a destination selection screen on the display, the destination selection screen being a screen for inputting transmission data and being configured to allow selection of a destination node for the DM communication, selection of a destination node for the ad hoc communication, and input of the transmission data, to be performed on the same screen;

wherein when input of the transmission data and selection of the destination node for the DTN communication are performed on the destination selection screen, the processor is notified of the input transmission data and the selected destination node for the DTN communication, and when input of the transmission data and selection of the destination node for the ad hoc communication are performed on the destination selection screen, the processor is notified of the input transmission data and the selected destination node for the ad hoc communication, the processor is configured to refer to the routing table for the DTN communication to select a next hop node to be used for transferring the transmission data to the notified destination node, and transmits the transmission data to the next hop node via the transceiver, and the processor is configured refer to the routing table for the ad hoc communication to select a next hop node to be used for transferring the transmission data to the notified destination node, and transmits the transmission data to the next hop node via the transceiver.

9. A destination node selection method executed by a node for delay tolerant network (DTN) and ad hoc communication, wherein the method comprises:

storing delivery predictabilities for each of destination nodes, the delivery predictabilities including a delivery predictability for the destination node calculated by a local node and a delivery predictability for the destination node calculated by a neighboring node, for each name of the destination node described in the node list;

determining a next hop node with respect to each destination node based on the delivery predictabilities for each of the destination nodes, and create a routing table for the DIN communication in which a name of the destination node and a name of the next hop node are described;

determining a next hop node with respect to each destination node based on a proactive-type routing protocol, and create a routing table for the ad hoc communication in which a name of the destination node and a name of the next hop node are described;

allowing selection of a destination node for DTN communication with the local node as a source node based on the delivery predictabilities for each of the destination nodes allowing selection of a destination node for the ad hoc communication with the local node as a source node based on the routing table, and displaying a destination selection screen on the display, the destination selection screen being a screen for inputting transmission data and being configured to allow selection of a destination node for the DTN communication, selection of a destination node for the ad hoc communication, and input of the transmission data, to be performed on the same screen;

wherein when input of the transmission data and selection of the destination node for the DTN communication are performed on the destination selection screen, notifying of the input transmission data and the selected destination node for the DTN communication, and when input of the transmission data and selection of the destination node for the ad hoc communication are performed on the destination selection screen, notifying of the input transmission data and the selected destination node for the ad hoc communication, the method further comprising refering to the routing table for the DTN communication to select a next hop node to be used for transferring the transmission data to the notified destination node, and transmits the transmission data to the next hop node via the transceiver, and refering to the routing table for the ad hoc communication to select a next hop node to be used for transferring the transmission data to the notified destination node, and transmits the transmission data to the next hop node via the transceiver.

10. A non-transitory computer-readable medium storing a program comprising instructions for delay tolerant network (DTN) communication and ad hoc communication comprising:

storing delivery predictabilities for each of destination nodes, the delivery predictabilities including a delivery predictability for the destination node calculated by a local node and a delivery predictability for the destination node calculated by a neighboring node, for each name of the destination node described in the node list;

determining a next hop node with respect to each destination node based on the delivery predictabilities for each of the destination nodes, and creating a routing table for the DTN communication in which a name of the destination node and a name of the next hop node are described;

allowing selection of a destination node for DTN communication with the local node as a source node based on the delivery predictabilities for each of the destination nodes, and allowing selection of a destination node for the ad hoc communication with the local node as a source node based on the routing table, and displaying a destination selection screen on the display, the destination selection screen being a screen for inputting transmission data and being configured to allow selection of a destination node for the DTN communication, selection of a destination node for the ad hoc communication, and input of the transmission data, to be performed on the same screen;

wherein when input of the transmission data and selection of the destination node for the DTN communication are performed on the destination selection screen, notifying of the input transmission data and the selected destination node for the DTN communication, and when input of the transmission data and selection of the destination node for the ad hoc communication are performed on the destination selection screen, notifying of the input transmission data and the selected destination node for the ad hoc communication, referring to the routing table for the DTN communication to select a next hop node to be used for transferring the transmission data to the notified destination node, and transmitting the transmission data to the next hop node via the transceiver, and referring to the routing table for the ad hoc communication to select a next hop node to be used for transferring the transmission data to the notified destination node, and transmitting the transmission data to the next hop node via the transceiver.

11. The destination node selection method according to claim 9, further comprising:
   displaying a destination selection screen, the destination selection screen displaying the destination node with the delivery predictability equal to or more than a threshold and the destination node with the delivery predictability less than the threshold so as to be distinguished from each other.

12. The destination node selection method according to claim 11, further comprising:
   displaying the destination nodes arranged in decreasing or increasing order of the delivery predictabilities.

13. The destination node selection method according to claim 11, further comprising:
   displaying the destination node with the delivery predictability equal to or more than the threshold and the destination node with the delivery predictability less than the threshold in different display forms from each other.

14. The destination node selection method according to claim 9, further comprising:
   displaying a destination selection screen, the destination selection screen having a list of the destination nodes provided with the delivery predictabilities.

15. The destination node selection method according to claim 9, further comprising:
   displaying a destination selection screen, the destination selection screen having a list of the destination nodes with the delivery predictabilities equal to or more than a threshold.

16. The destination node selection method according to claim 9, further comprising:
   allowing selection of a destination node for a mobile phone call with the local node as a caller, based on whether or not the local node is out of a mobile phone service area.

* * * * *